United States Patent
Carroll

(10) Patent No.: US 7,434,428 B1
(45) Date of Patent: Oct. 14, 2008

(54) ANTI-THEFT PEDAL LOCKING DEVICE FOR MOTOR VEHICLES

(76) Inventor: John William Carroll, P.O. Box 742, Berkeley, CA (US) 94701

( * ) Notice: Subject to any disclaimer, the term of this patent is extended or adjusted under 35 U.S.C. 154(b) by 0 days.

(21) Appl. No.: 11/784,167

(22) Filed: Apr. 5, 2007

(51) Int. Cl.
*F16H 57/00* (2006.01)

(52) U.S. Cl. .............................. 70/200; 70/203; 70/237

(58) Field of Classification Search ........... 70/198–203, 70/237, 238, 254; 254/DIG. 5
See application file for complete search history.

(56) References Cited

U.S. PATENT DOCUMENTS

| | | | |
|---|---|---|---|
| 1,165,352 A * | 12/1915 | Whiteside ..................... | 70/202 |
| 1,211,064 A * | 1/1917 | Boyce .......................... | 70/202 |
| 1,247,512 A * | 11/1917 | Dobler ......................... | 70/202 |
| 1,317,547 A * | 9/1919 | Cameron ...................... | 70/199 |
| 1,318,443 A | 10/1919 | Gimperling | |
| 1,329,644 A * | 2/1920 | Van Deventer et al. ........ | 70/200 |
| 1,388,149 A | 8/1921 | Friedrich | |
| 1,442,203 A * | 1/1923 | Williams et al. .............. | 70/202 |
| 1,444,935 A * | 2/1923 | Mokracek .................... | 70/200 |
| 1,494,717 A * | 5/1924 | Sell ............................. | 70/203 |
| 1,527,992 A * | 3/1925 | Norton ......................... | 70/200 |
| 4,076,095 A | 2/1978 | Adamski | |
| 4,333,326 A | 6/1982 | Winters | |
| 4,493,198 A | 1/1985 | Brown | |
| 4,700,555 A | 10/1987 | Robertson, Sr. et al. | |
| 4,993,248 A | 2/1991 | Nordberg | |
| 5,022,697 A * | 6/1991 | Hettwer ..................... | 296/37.6 |
| 5,267,458 A | 12/1993 | Heh | |
| 5,282,373 A | 2/1994 | Riccitelli | |
| 5,537,846 A | 7/1996 | Simon | |
| 5,613,382 A | 3/1997 | Uter | |
| 5,639,001 A * | 6/1997 | Brady ......................... | 224/449 |
| 5,715,710 A | 2/1998 | De Lucia et al. | |
| 5,845,521 A | 12/1998 | Najera | |
| 5,906,121 A | 5/1999 | Mankarious | |
| 5,921,116 A | 7/1999 | Goldenberg | |
| 5,979,197 A | 11/1999 | Mellini et al. | |
| 6,006,559 A | 12/1999 | Hsu | |
| 6,202,456 B1 | 3/2001 | Vickers | |
| 6,662,894 B2 * | 12/2003 | Chantrasuwan et al. ...... | 180/287 |
| 6,758,071 B1 * | 7/2004 | Reeb et al. ..................... | 70/201 |
| 6,792,780 B1 | 9/2004 | De Lucia | |
| 2005/0103065 A1 * | 5/2005 | Dennis ........................... | 70/56 |

* cited by examiner

*Primary Examiner*—Lloyd A Gall

(57) ABSTRACT

A portable anti-theft brake pedal locking device for a motor vehicle, comprising a horizontal barrier member, upwardly extending, u-shaped rod shackle engaging members, and a manner of locking the device against removal from beneath existing brake/clutch pedal(s). The manner of locking may be either by a lock integral to the anti-theft device, in the form of a pivoting catching lock member, or by a lock independent of the anti-theft device, such as by a padlock. This portable anti-theft device in its preferred embodiment may be double-locked through use of the lock integral to the anti-theft device, and also secondarily by use of the independent locking padlock. Through the placement of this device beneath the under edge of a brake pedal shaft, the under edge of a clutch pedal shaft when present, against the vehicle floorboard, and locking the device to the brake pedal shaft, a resulting disabling of the operation of such pedals is accomplished by preventing the pedals being depressed. This anti-theft device is a significant improvement over prior art in being universal as to application, simple in its operation, compact and thus easily stored.

14 Claims, 13 Drawing Sheets

ANTI-THEFT PEDAL LOCKING DEVICE FOR MOTOR VEHICLES

CROSS REFERENCE TO RELATED APPLICATIONS

Not applicable

FEDERALLY SPONSORED RESEARCH

Not applicable

SEQUENCE LISTING OR PROGRAM

Not applicable

BACKGROUND OF INVENTION

1. Field of Invention

This invention relates to a portable, anti-theft brake pedal locking device for motor vehicles, a device that encompasses an additional barrier to clutch operation when a clutch is present, this device being suitable for manual as well as automatic transmission systems. Specifically, the invention incorporates a system that prevents the brake/clutch pedal(s) from being depressed.

2. Prior Art

Patents have been issued on anti-theft devices since the inception of the motor vehicle for transportation. Some of these inventions have been less than credible. More usually, the inventions have been impractical, could be defeated without great effort, and in some cases hazardous when put into use. In all cases portable anti-theft devices should be: maximally secure; user friendly; light in weight; easily stored; universal as to employment; designed to be efficiently manufactured; reasonable in cost; and visible. Prior art anti-theft inventive solutions have failed in one or more parts to equal the foregoing condition.

Inventions incorporating steering wheel and steering wheel to brake/clutch pedal(s) locking have been patented. Such devices are not secure due to the fact that they are easily defeated by the simple act of cutting the wheel rim. (By reason of safety, a steering wheel rim should not be fabricated of hardened metal, in that malleability of its fabrication offers some protection to the driver in case of impact.) Usually, these devices are also complicated to install and difficult to be stored.

U.S. Pat. No. 4,856,308, Aug. 15, 1989, Johnson, discloses an elongated body member incorporating hooking means, lockable to a steering wheel, preventing its easily being turned.

U.S. Pat. No. 5,704,233, Jan. 6, 1998, Farshad, discloses a rod member, extending from a brake pedal catch member to a steering wheel catch member, lockable and thereby preventing operation of either steering wheel or brake pedal.

U.S. Pat. No. 6,653,133, Aug. 5, 1997, Passantino, discloses a connection between a steering wheel and brake pedal of a most complex character.

Other anti-theft devices are either wholly or in part permanently installed on the vehicle. Damage to the vehicle can be incurred through such installations; these installations are always expensive; hazards to the occupants are at times introduced; inconvenience in almost every case is increased; and the disabling of such devices is sometimes accomplished by the removal of a single connector. These devices are also not compatible to many vehicles.

U.S. Pat. No. 5,263,345, Nov. 23, 1993, Zagorac, discloses a cable extending between a lockable safety-brake lever, connected to a floor member beneath the operator pedals, activated by the engagement of the safety-brake lever.

U.S. Pat. No. 5,040,387, Aug. 20, 1991, Knott, Jr., discloses an assembly between a lockable means and an engaging cable, extending to an apparatus that extends upwardly through the floorboard under a brake pedal, designed to clasp the pedal in a depressed position when the system is activated.

U.S. Pat. No. 4,934,492, Jun. 19, 1990, Hayes-Sheen, discloses a hydraulic brake locking system, activated by turning off the ignition switch, and maintaining the brake in a locked position until the system is deactivated.

Electronic anti-theft systems suffer from being expensive installations; from being readily defeated by any knowledgeable person; by being an insecure means of protection when a vehicle is parked or stored at some remote location. Backpackers, hunters, fishermen, bird watchers and skiers, who will often park a vehicle at the end of some roadway, gain little protection from such electronic means. By the time such persons return to their vehicles ample time has expired to fully disable even electronic locator systems.

BRIEF SUMMARY OF THE INVENTION

In summation, any vehicle anti-theft device functions in only a deterrence capacity. Every device may eventually be defeated. Of the eight categorized features listed above, it is believed the vehicle anti-theft device herein being submitted for patenting is more fully in compliance then other prior art. It should be readily recognized that the present design is compact enough to to be easily stored within the passenger compartment of any vehicle. Its simplicity of design permits use of this anti-theft device in most vehicles. The double-locking features of the preferred embodiment of this device offers considerable deterrence against theft. In all cases, the clustering of locking members about the brake pedal shaft renders difficult access for purposes of cutting or prying against said shaft. Manufacture of the present design presents no difficulty to those persons versed in the art of mass production. Visibility may be easily assured, by the location of decals or other identifiers about noticeable locations of the vehicle.

It is accordingly an outstanding objective of the invention to provide an improved design for a vehicle anti-theft device, one that may be easily placed beneath the brake/clutch pedal (s) of a vehicle, locked in place, thereby disabling the operation of such pedal(s), and thus preventing the theft of the motor vehicle.

Another objective is to provide a vehicle anti-theft device that may be easily stored within the passenger compartment of a motor vehicle. In the instance of this present invention, a device compact enough to be stored under a seat, or in a dashboard compartment of the vehicle, the stated requirement is satisfied.

Still the further objective is the provision of a vehicle-anti-theft device of the foregoing character, that may be easily manufactured, and thus economical in cost to the end-user.

PARTS LIST

| 30 | barrier member |
|---|---|
| 30A | tubing |
| 32 | handle |
| 32A | hollow core |
| 32B | moldable inner formation |
| 32C | resiliant surfacing |
| 34 | bottom spacer |
| 35 | adhesive aggregate mix |
| 36 | end-cap |
| 38 | engaging padlock shackle |
| 40 | padlock |
| 42 | brake pedal assembly |

-continued

| 43 | brake pedal shaft |
|---|---|
| 44 | coupling nut |
| 46 | spacer-screw |
| 48 | handle hole |
| 50 | threaded stud |
| 52 | nut |
| 54 | handle housing |
| 54A | inner formation |
| 54B | resilient surface |
| 56 | grip-member |
| 57 | grip set-screw |
| 58 | lock |
| 60 | handle assembly |
| 62 | catching lock member |
| 63 | slot (shackle end) |
| 64 | horizontal barrier piece |
| 64A | containment tube |
| 65 | top cut-out |
| 66 | enclosure assembly |
| 66A | left member |
| 66B | right member |
| 67 | bottom cut-out |
| 68 | retainment fitting |
| 70 | spacer-screw hole |
| 72 | pivot pin |
| 74 | sliding-guide |
| 76 | catching lock member assembly |
| 76A | pivoting operator |
| 76B | hex socket indentation |
| 78 | housing set screw |
| 80 | enclosure assembly screw |
| 82 | housing recess-hole |
| 84 | connector pin |
| 86 | press-fit pin |
| 88 | lock containing control rod |
| 88A | rotational groove |
| 88B | hex-ballpoint tip-end |
| 88C | catch slot (lock pin) |
| 90 | housing (control rod) |
| 91 | lock pin |
| 92 | lock-pin recess |
| 94 | reinforcement bar |
| 96 | spacer-screw location |
| 98 | u-shaped rod shackles |
| 99 | indentation depressions |
| 100 | elongated barrier mass |
| 100A | adapter piece |
| 100B | small size |
| 100C | intermediate size |
| 100D | large size |

DETAILED DESCRIPTION OF THE INVENTION

Figure 1:
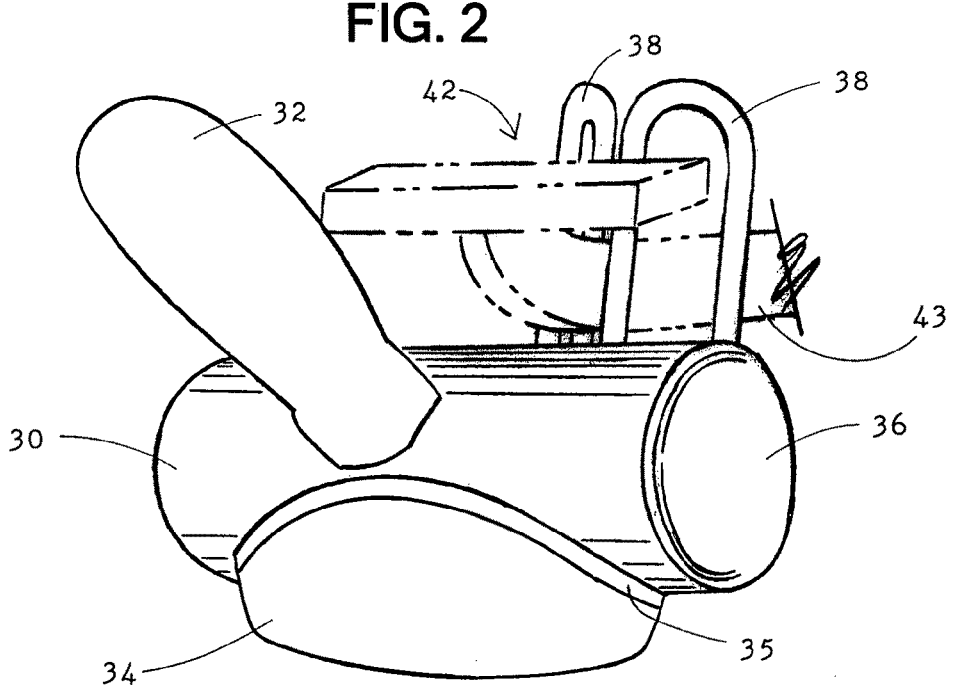
FIG. 1 is a front perspective view of a first embodiment of the pedal locking device with a brake pedal shaft positioned between the engaging padlock shackles.

The present invention will now be described to illustrate but not to limit its design according to its preferred embodiments as referenced by the enclosed drawings, wherein:

Making reference to FIG. 1, a first embodiment of the anti-theft locking device comprising a barrier member 30, a bottom spacer 34, and adhesive aggregate mix 35, engaging padlock shackles 38 positioned to either side of the brake pedal assembly 42, thereby partially enclosing the brake pedal shaft 43, in readiness for the locking means in the form of an independent locking device. Still referring to FIG. 1, a handle 32 is provided for ease in placement of the device beneath the brake pedal assembly 42, end-caps 36 are provided for the containment of the adhesive aggregate mix within the barrier member 30.

Figure 2:
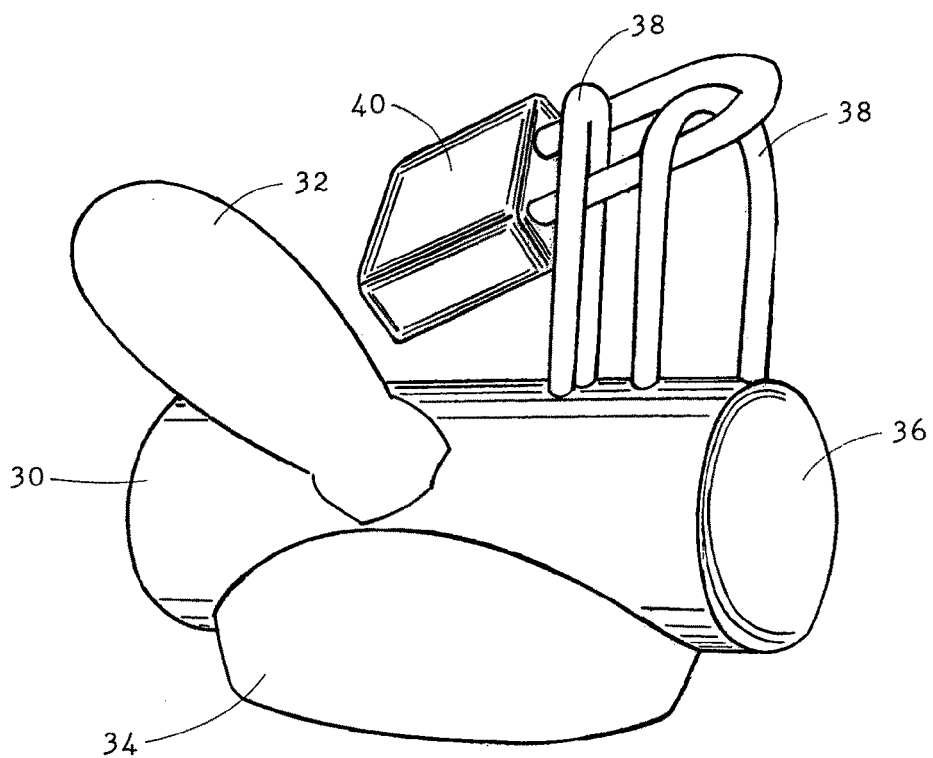
FIG. 2 is a similar view of the pedal locking device showing one independent locking means in the form of a padlock.

Referring to FIG. 2, items of the foregoing description are applicable with the addition of a padlock 40, suggested as an independent locking means, included here to illustrate the manner of attachment.

Figure 3:
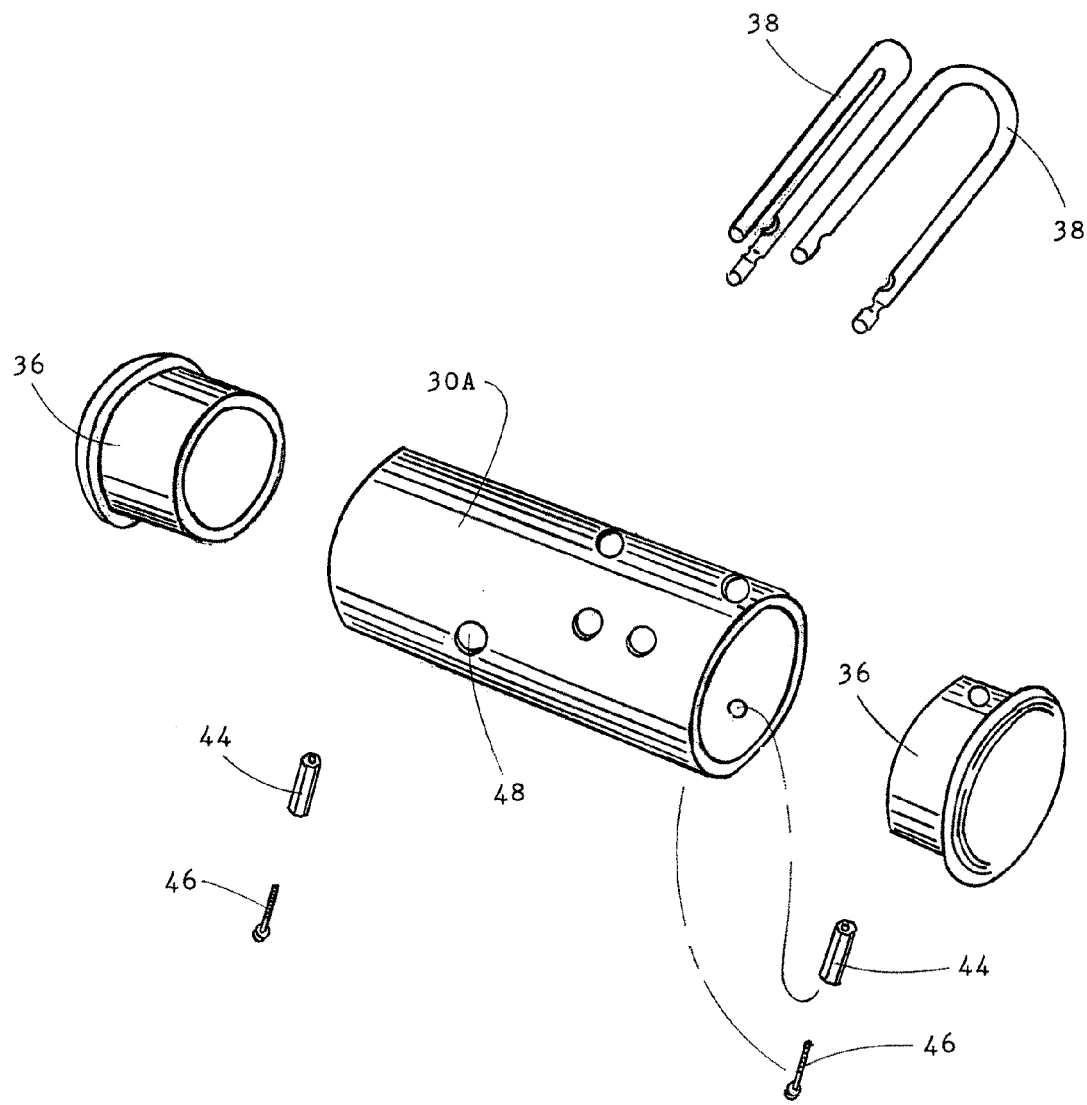
FIG. 3 is an exploded view of this first embodiment of the device showing the major components disassembled.

FIG. 3 is an exploded view of components of the device comprising engaging padlock shackles 38 and the holes provided for their placement in the tubing 30A for the barrier member 30, a handle hole 48 indicated for the handle 32 (not shown), holes for coupling nuts 44 and spacer-screws 46, employed in the attachment of the bottom spacer 34 to the underside of the barrier member 30, and the two end-caps 36.

Figure 4:
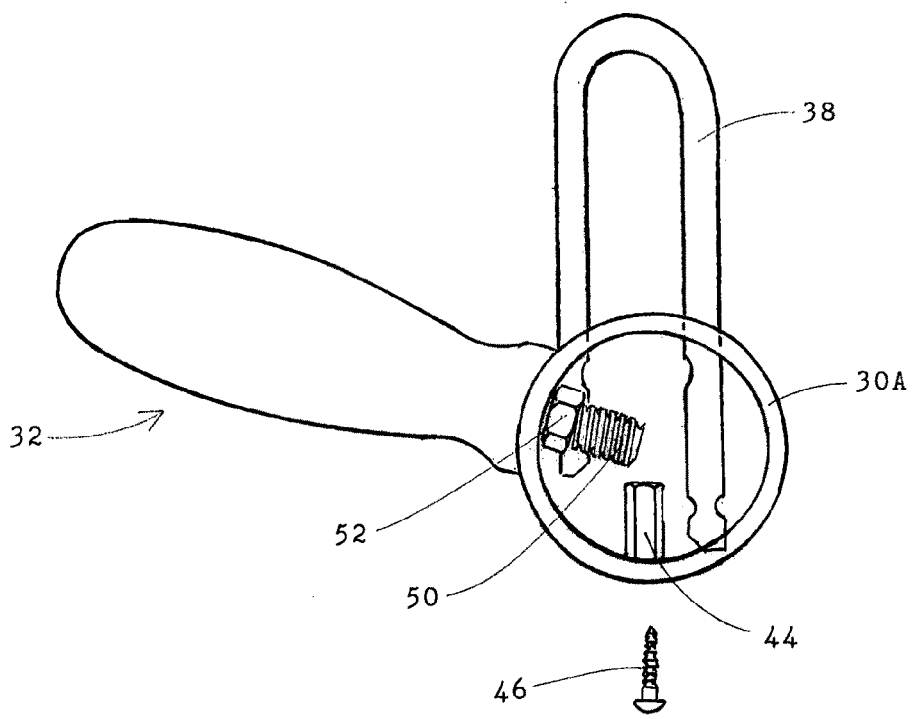
FIG. 4 is a partially sectioned view of the attachment means for the handle of the pedal locking device.

FIG. 4 shows a side view of means for the attachment of the handle 32 (threaded stud 50 & nut 52), the placement of the engaging padlock shackle 38, the location of the coupling nut 44, and the orientation of the space-screws 46; all internal parts held fixedly in place by the adhesive aggregate mix 35 within the tubing 30A.

Figure 5:
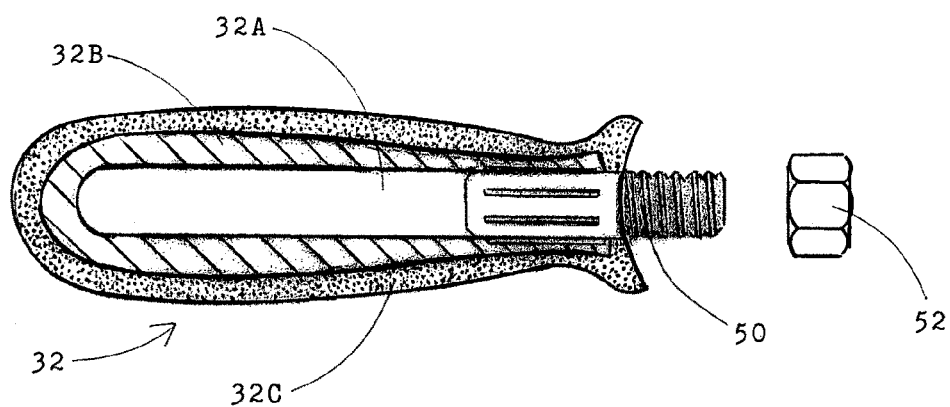
FIG. 5 is a partially sectioned view of the handle for the device.

FIG. 5 shows a partial sectional view of the handle 32, comprising a hollow core 32A (for lightness in weight), moldable inner formation 32B, a resilient surfacing 32C, and an internally fixed threaded stud 50, and a lock nut 52.

Figure 6:
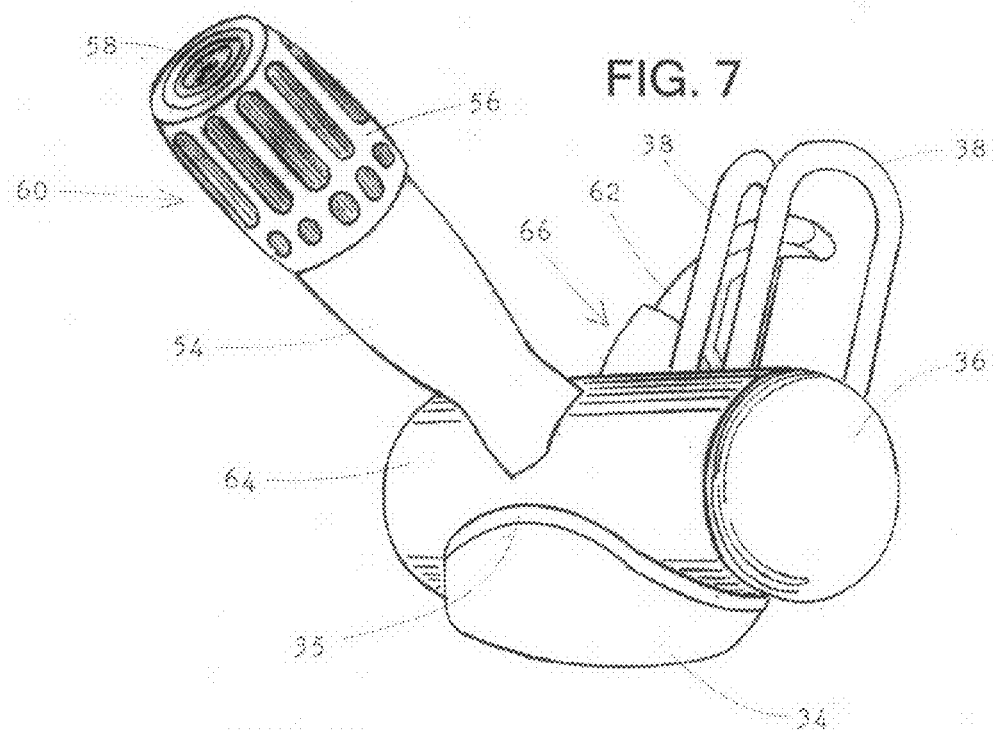
FIG. 6 is a front perspective view of a second, preferred embodiment of the pedal locking device.

FIG. 6 shows a second, preferred embodiment of the anti-theft device according to the invention that comprises these following items of the first embodiment, a bottom spacer 34, adhesive aggregate mix 35, end-caps 36, engaging padlock shackles 38, the part, horizontal barrier piece 64, a different handle assembly 60, an integral locking means in the form of a catching lock member 62, as part of an enclosure assembly 66, and a lock 58, all to be further identified in FIGS. 8-20B.

Figure 7:
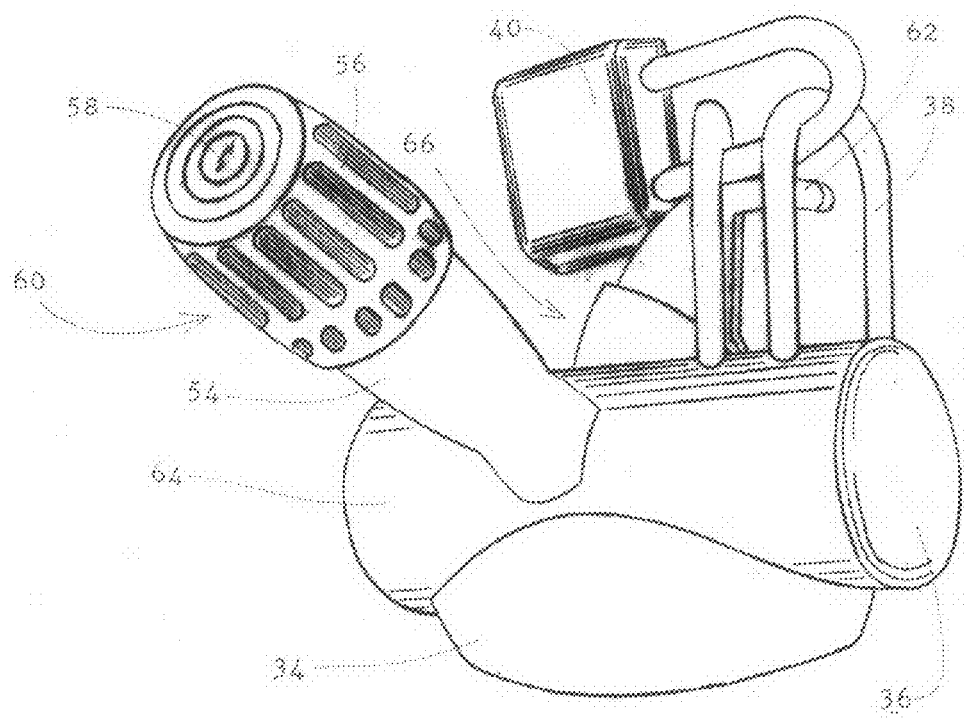
FIG. 7 is a similar view of the pedal locking device showing the integral locking means in addition to a padlock, shown as an independent, secondary locking means.

FIG. 7 comprises all of the elements of the foregoing FIG. 6, but also includes an independent, secondary locking means, as suggested in the form of a padlock 40, included here to illustrate the form of attachment.

Figure 8:
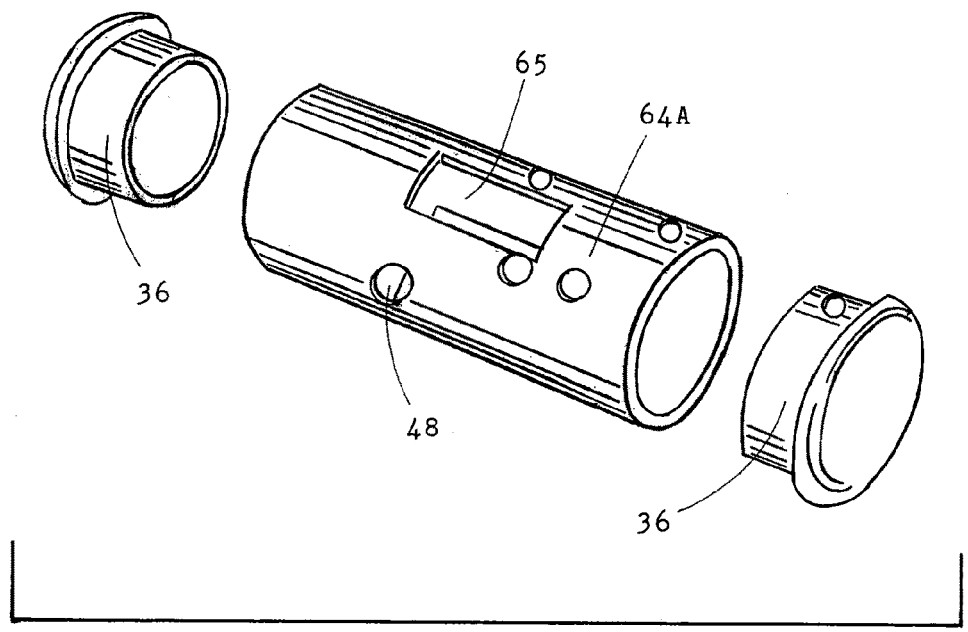
FIG. 8 is an exploded top view of the containment tube and end-caps for the device.

FIG. 8 shows a top exploded view of the containment tube 64A for the horizontal barrier piece 64, further displaying a top cut-out 65 for the therethrough extension of the upper portion of the enclosure assembly 66, further including the end-caps 36.

Figure 9:
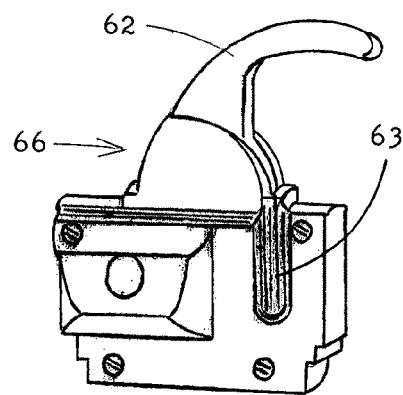
FIG. 9 is a perspective front view of the enclosed, integral catch locking means.

FIG. 9 shows a front perspective view of the enclosure assembly 66, the catching lock member 62, and a slot 63 required for the installation of one of the engaging shackles 38.

Figure 10:
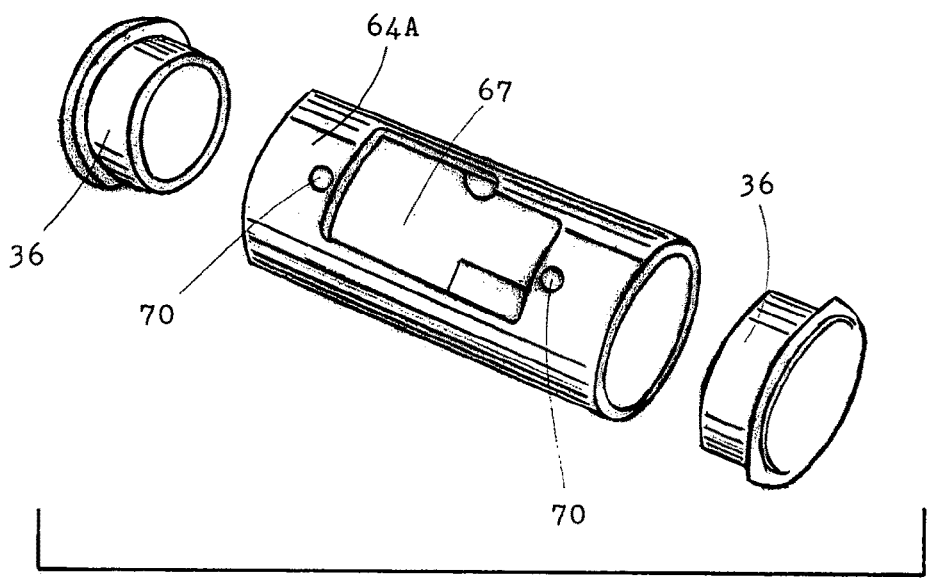
FIG. 10 is an exploded bottom view of the containment tube and end-caps.

FIG. 10 shows a bottom exploded view of the containment tube 64A for the horizontal barrier piece 64, further displaying a bottom cut-out 67 for the installation of the enclosure assembly 66 from the underside of the horizontal barrier piece 64, the location of holes 70 employed for the placement of bottom spacer 34, and the end-caps 36.

Figure 11:
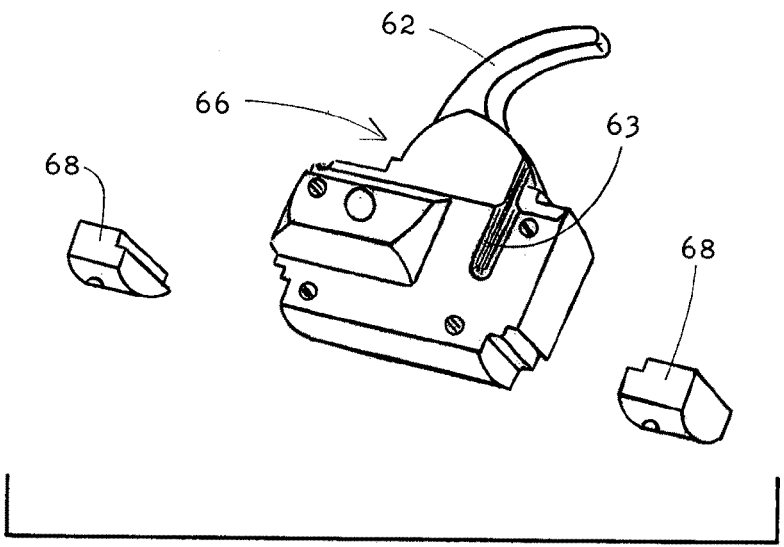
FIG. 11 is a perspective view from a different angle of the enclosed integral catch locking means including retainment fittings.

FIG. 11 shows a partial exploded view of the enclosure assembly 66, including the catching lock member 62, slot 63 for placement of one shackle end, and two retainment fittings 68.

(Note: the retainment fittings 68 supplant the coupling nuts 44 of the first embodiment, but also functions as a holding means against movement of the enclosure assembly 66 when the adhesive aggregate mix 35 is being injected into the containment tube 64A.)

(Additional note: the adhesive aggregate mix does not limit the plurality of options available, such as a plasticized-microsphere mix for one. Such a variety of substances are well known to those skilled in the art, such substances being capable of fixedly holding elemental parts within the part, horizontal barrier piece 64.)

Figure 12:
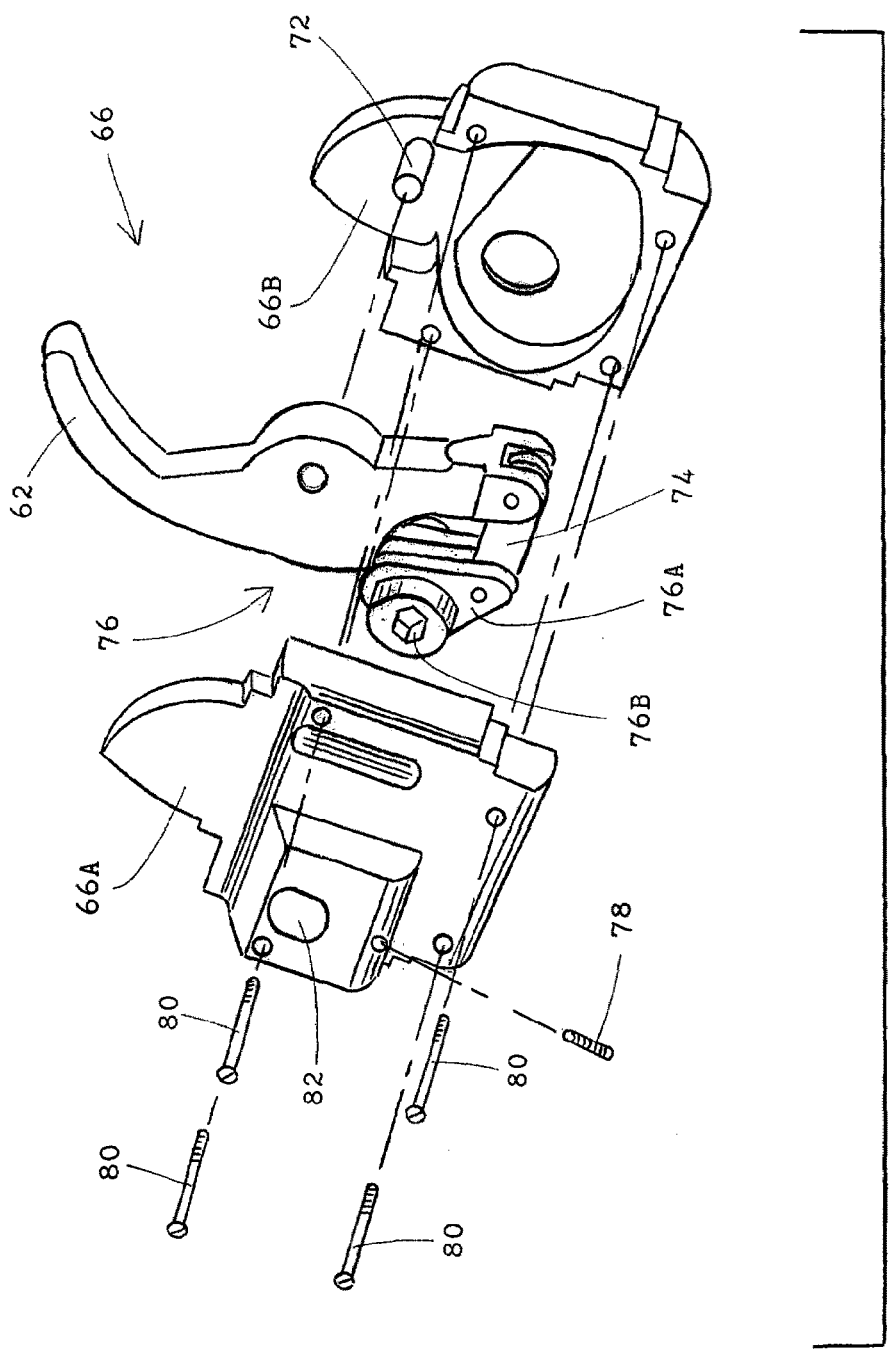
FIG. 12 is an exploded view of the enclosed integral catch locking means.

FIG. 12 shows an exploded view of the enclosure assembly 66, which clarity should be self-evident, with the catching lock member 62 rotating about the pin 72, and the operation to be further clarified in FIGS. 15, 19, 20a & 20 b.

Figure 13:
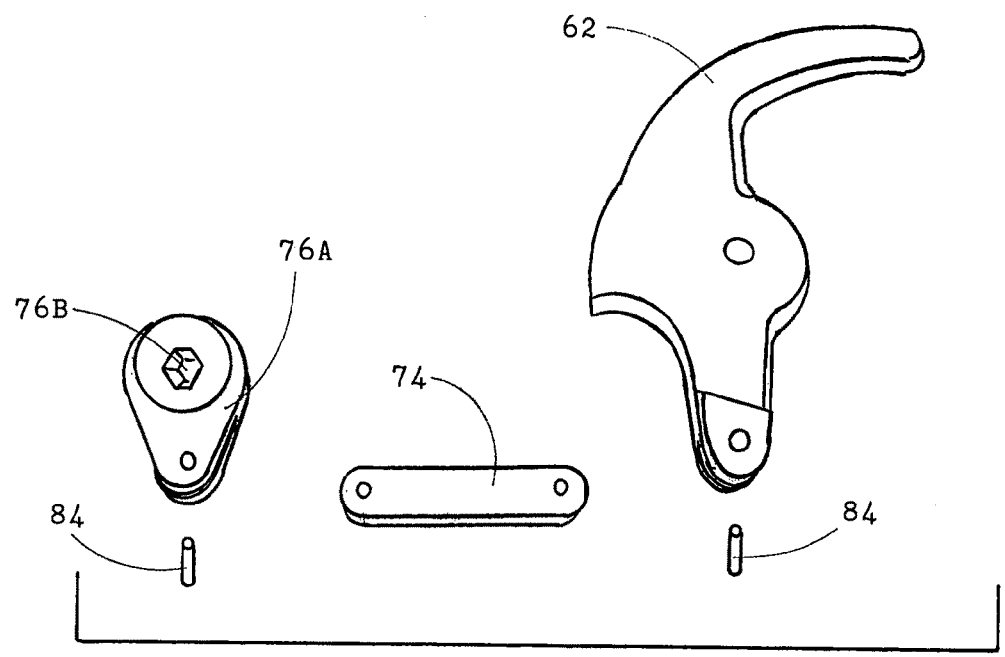
FIG. 13 is a front perspective view of the primary moving parts for the catching lock member.

FIG. 13 shows a front perspective view of the operational parts of the catching-member, enclosure assembly 66, comprising the catching lock member 62, the pivoting operator 76A, a hex socket indentation 76B, the sliding-guide 74, and the connector pins 84.

Figure 14:
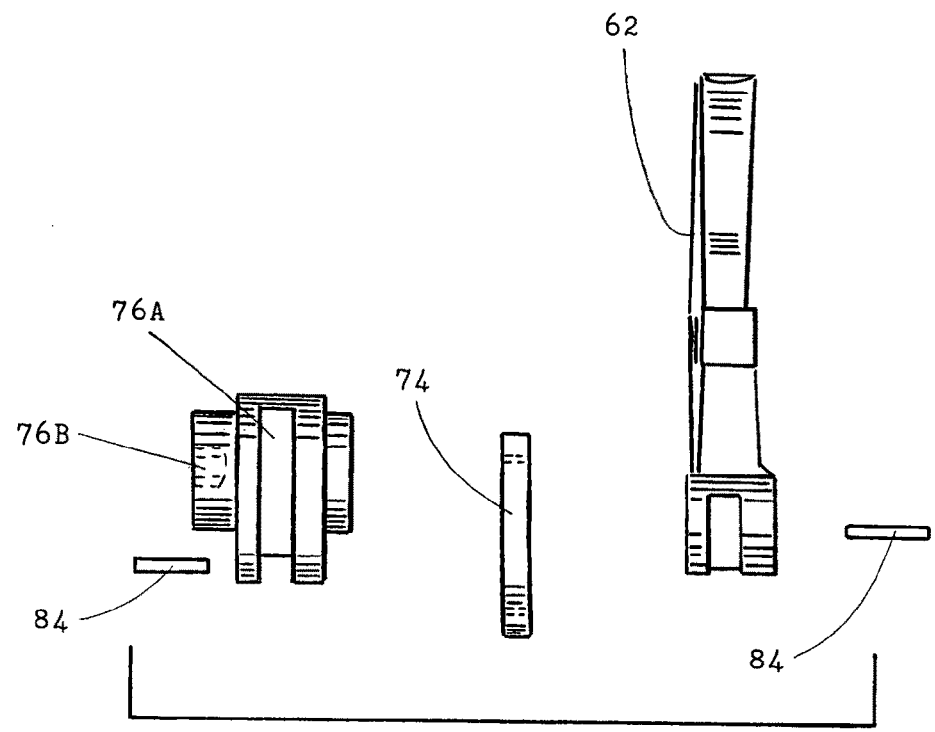
FIG. 14 is a side perspective view of the primary moving parts for the catching lock member.

FIG. 14 shows substantially the same items identified in FIG. 13, but from a side view position.

Figure 15:
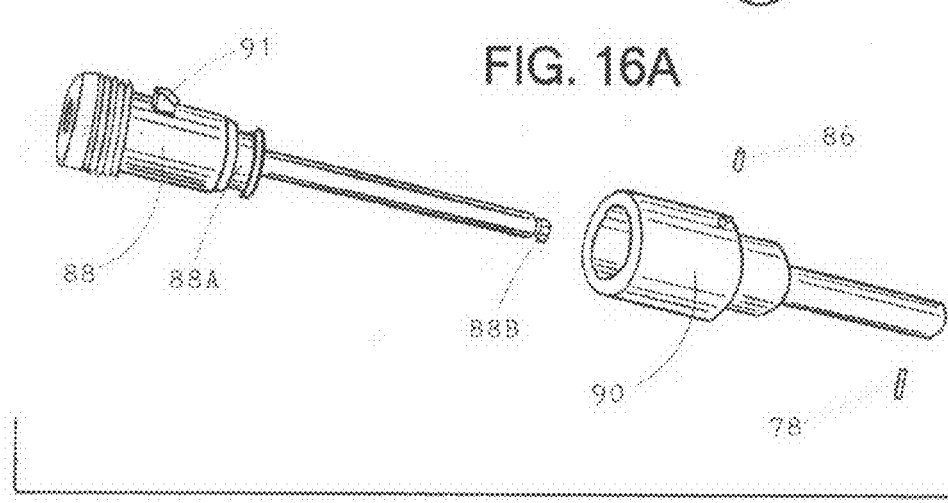
FIG. 15 is an exploded view of the operational parts for the handle for this preferred embodiment of the pedal locking device.

FIG. 15 displays an exploded view of the operational parts of the handle assembly 60, comprising a housing 90 for the lock-containing control rod 88, indicating a rotational groove 88A, which operates to fix the lock-containing control rod 88 within the housing 90 by means of a press fit pin 86, and a set screw 78 that fixes the housing 90 within the catching-member, enclosure assembly 66, which becomes additionally fixed in place within the horizontal barrier piece 64 with the injection of the adhesive aggregate mix 35. (Note: the end tip of the lock containing control rod 88 is formed to a hex-ballpoint tip-end 88B.)

Figure 16B:
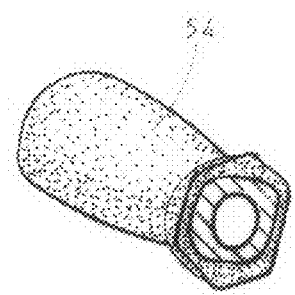
FIG. 16B is a different perspective view for this handle housing.
Figure 16A:
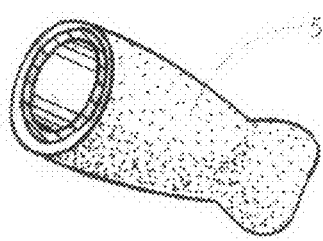
FIG. 16A is a perspective view for the handle housing.

FIG. 16A is a perspective view of the handle housing 54, for the housing 90.

FIG. 16B is a perspective view of the handle housing 54 presented from a different angle.

Figure 17:
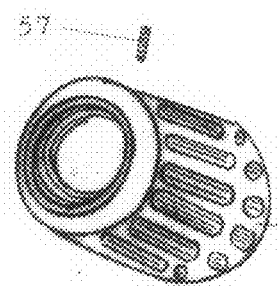
FIG. 17 is a perspective view of the rotatable grip-member for this handle.

FIG. 17 is a perspective view of the grip-member 56, formed to be threaded onto the lock-containing control rod 88 and fixed in place with the grip set-screw 57. (Note: the removal of the grip-member 56 by removal of the grip set-screw 57 is of no import since the security of the pedal locking device is not dependent on the grip-member 56.)

Figure 18:
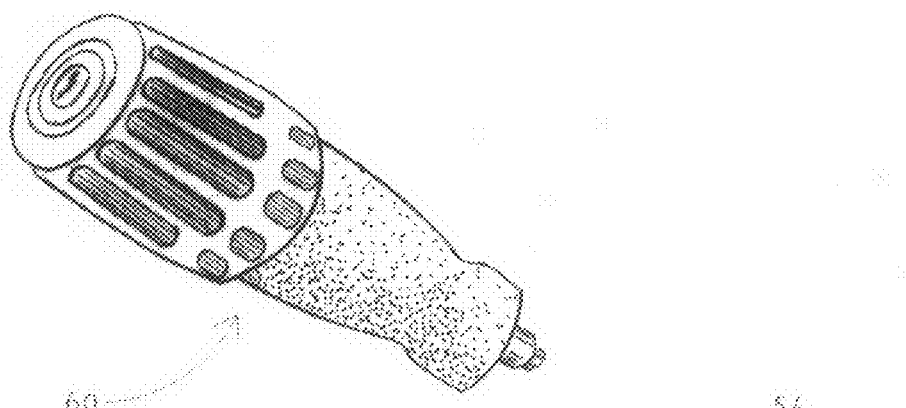
FIG. 18 is a perspective view of this handle assembled.

FIG. 18 is a perspective view of the handle assembly 60.

Figure 19:
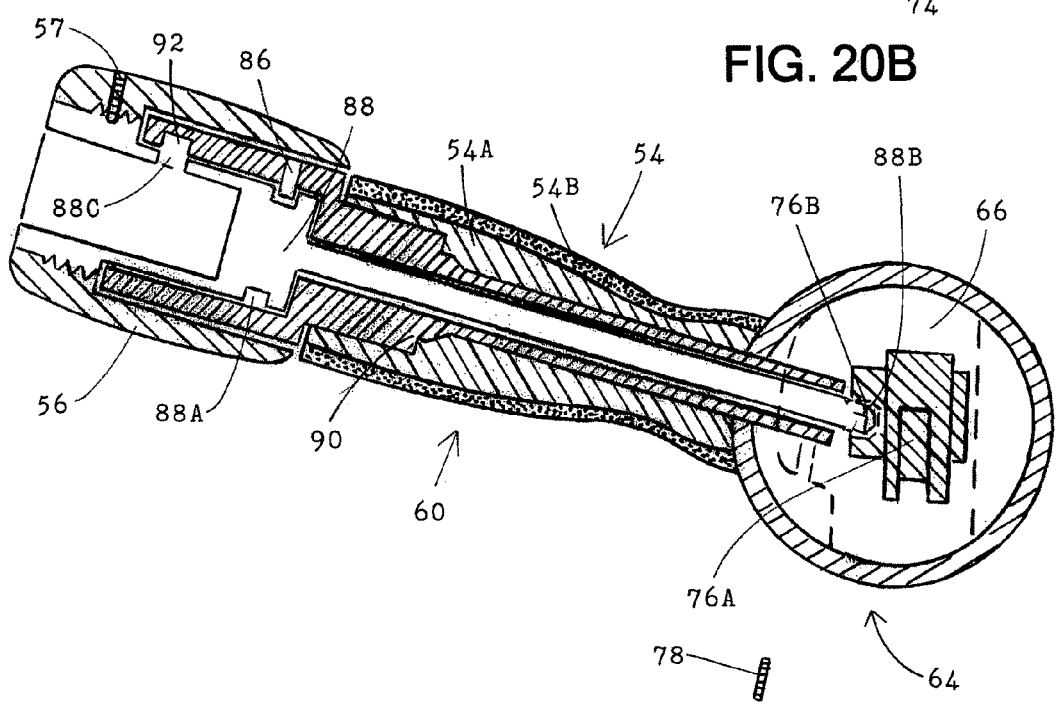
FIG. 19 is a sectional view of the handle.

FIG. 19 shows a sectional view of the handle assembly 60, comprising the lock-containing control rod 88, the housing 90, into which the lock containing control rod 88 is installed, its rotational groove 88A is engaged by the press-fit pin 86, the housing is fitted within its handle housing 54, the grip-member 56 is threaded onto the lock-containing control rod 88 and fixed in place by its grip set-screw 57, the end of the housing 90 enters the horizontal barrier piece 64, into the enclosure assembly 66, fixed therein by housing set-screw 78, with the hex-ballpoint tip-end 88B of the lock-containing control rod 88 engaging the socket indentation 76B of the pivoting operator 76A.

Referring again to FIG. 19, the catch receptacle 92 (within the housing 90) when in alignment with the lock-pin slot 88C, provided for the catching engagement of the lock-pin 91, of lock 58, thereby securing the lock-containing control rod 88 against rotation, and further preventing the catching lock member 62, from removal between the engaging shackles 38. In this manner the securing action of this anti-theft device is completed.

Figure 20A:
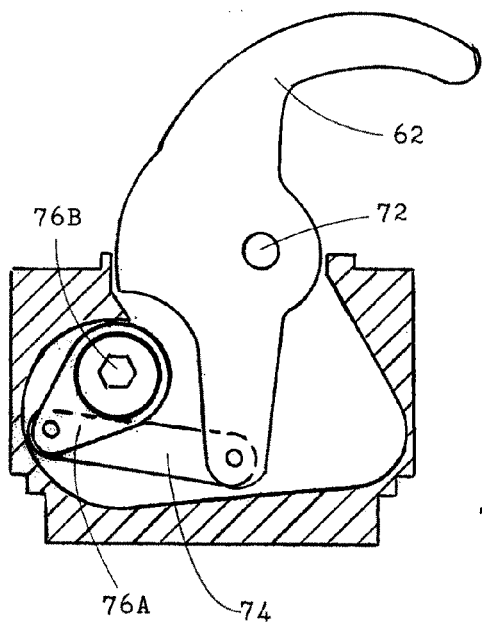
FIG. 20A is a viewing of the operational features of the catching lock member in the locked position.

FIG. 20A shows the operational features of the catching lock member 62 in the locked position, held in place through its connection via the sliding-guide 74, with the pivoting operator 76A, and held fast by the engagement of the hex-ballpoint tip-end 88B of the lock-containing control rod 88 with the socket indentation 76B of the pivoting operator 76A.

Figure 20B:
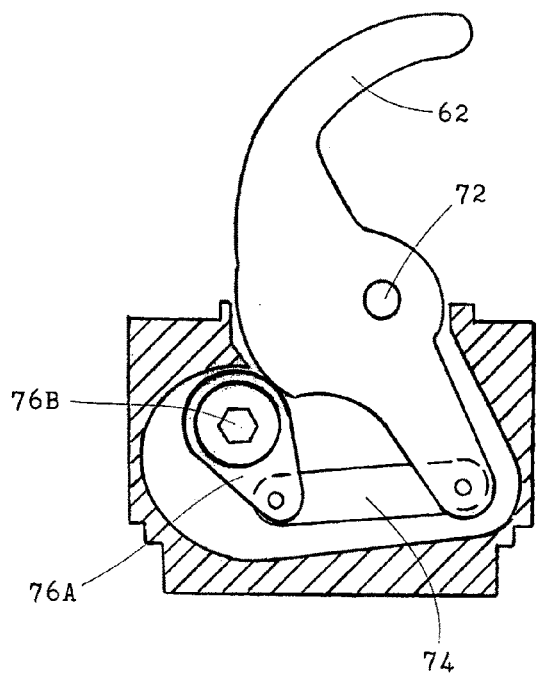
FIG. 20B is a viewing of the operational features of the catching lock member in the un-locked position.

FIG. 20B shows the catching lock member 62 in the unlocked position, moved via its connection through the sliding-guide 74, with the pivoting operator 76A, and through the rotational engagement between the lock-containing control rod 88, its hex-ballpoint tip-end 88B and the socket indentation 76B of the pivoting operator 76A.

Figure 21C:
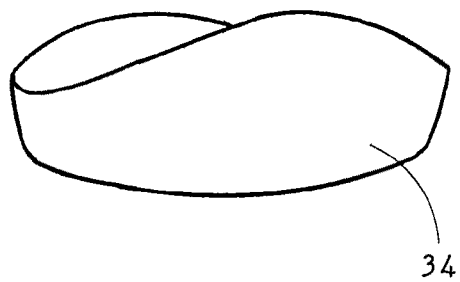
FIG. 21C is a perspective view of the same bottom spacer.
Figure 21B:
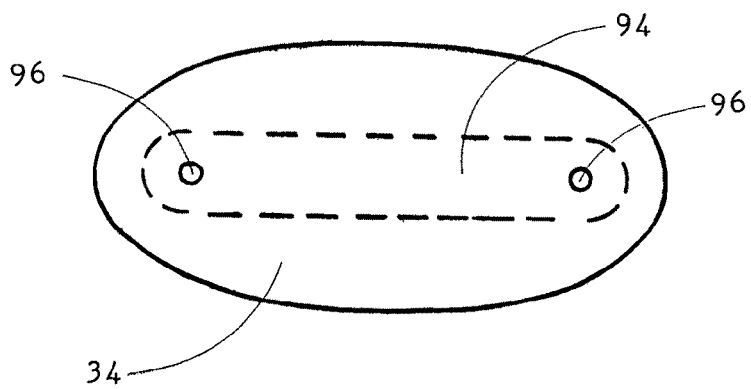
FIG. 21B is a top sectioned view of the same bottom spacer.
Figure 21A:
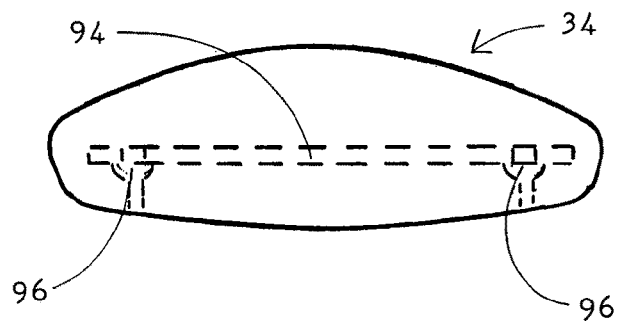
FIG. 21A is a front sectioned view of a bottom spacer.

FIG. 21A shows a front sectional view of the bottom spacer 34, including a reinforcement bar 94, and two locations 96 for spacer-screws 46.

FIG. 21B shows a top view identifying the same items of FIG. 21A.

FIG. 21C shows a perspective view of the bottom spacer 34.

Figure 22:
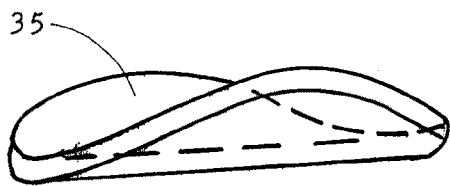
FIG. 22 is a perspective view of a reinforcement bar.

FIG. 22 displays a perspective view of the reinforcement bar 94.

Figure 23:
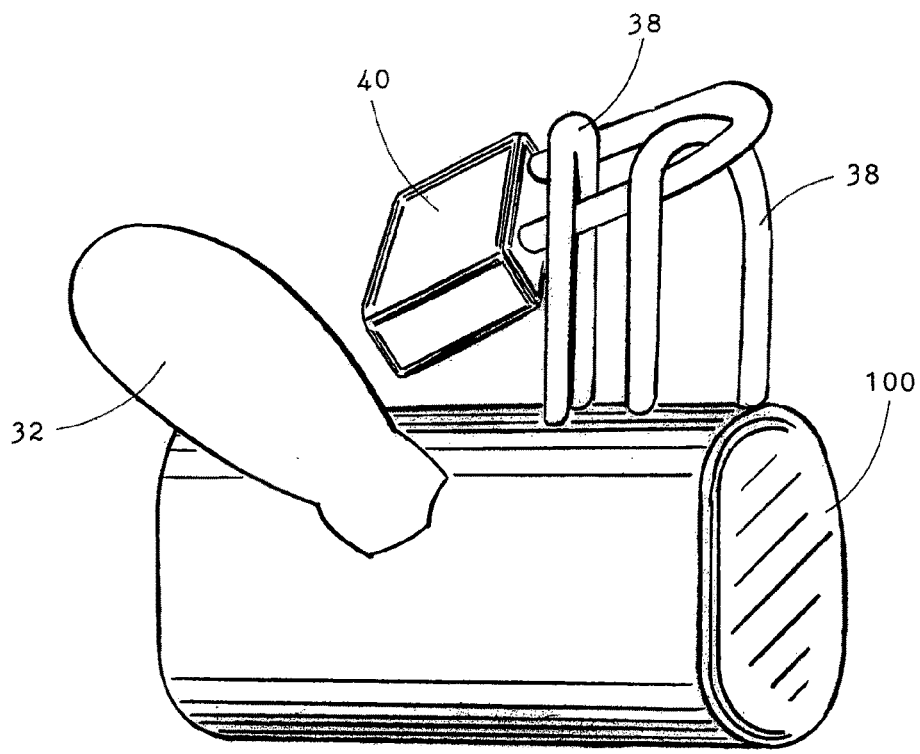
FIG. 23 is a front perspective view of a third embodiment of the pedal locking device.

FIG. 23 shows a perspective view of a third embodiment of the anti-theft device according to the invention, comprising the elongated barrier mass 100 in the form of a molded manufacture. Such molded form to include a plurality of configurations and sizes to meet the space requirement to accommodate the distance between the floorboard and brake pedal assembly. The handle 32, u-shaped rod shackles 98 and a padlock 40, suggested for an independent locking means, are further indicated.

Figure 24:
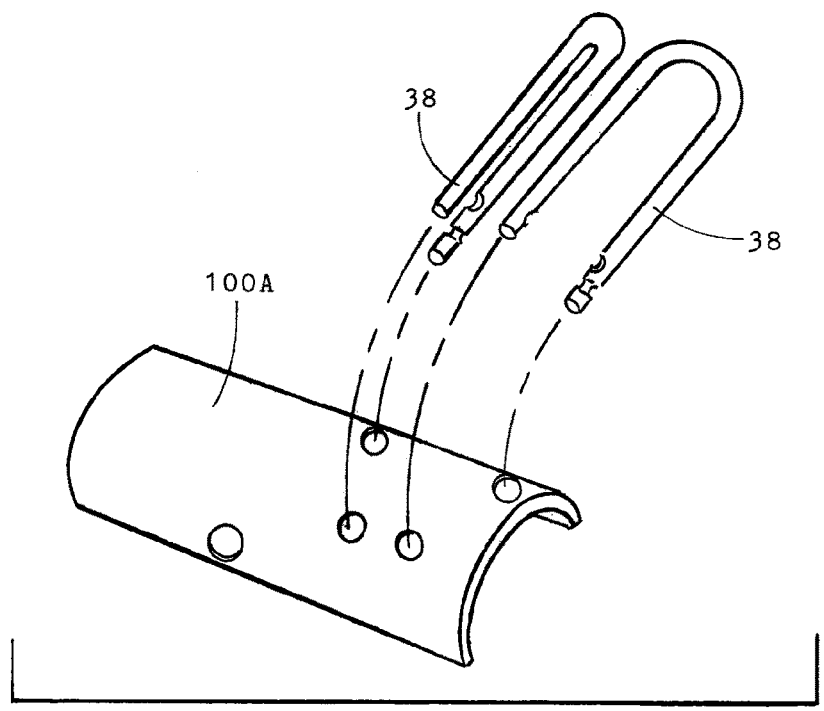
FIG. 24 is an exploded view of an adapter piece and engaging padlock shackles.

FIG. 24 shows an exploded view to include an adapter piece 100A suited to be part of the molded, elongated barrier mass 100, and the u-shaped rod shackles 98.

Figure 25:
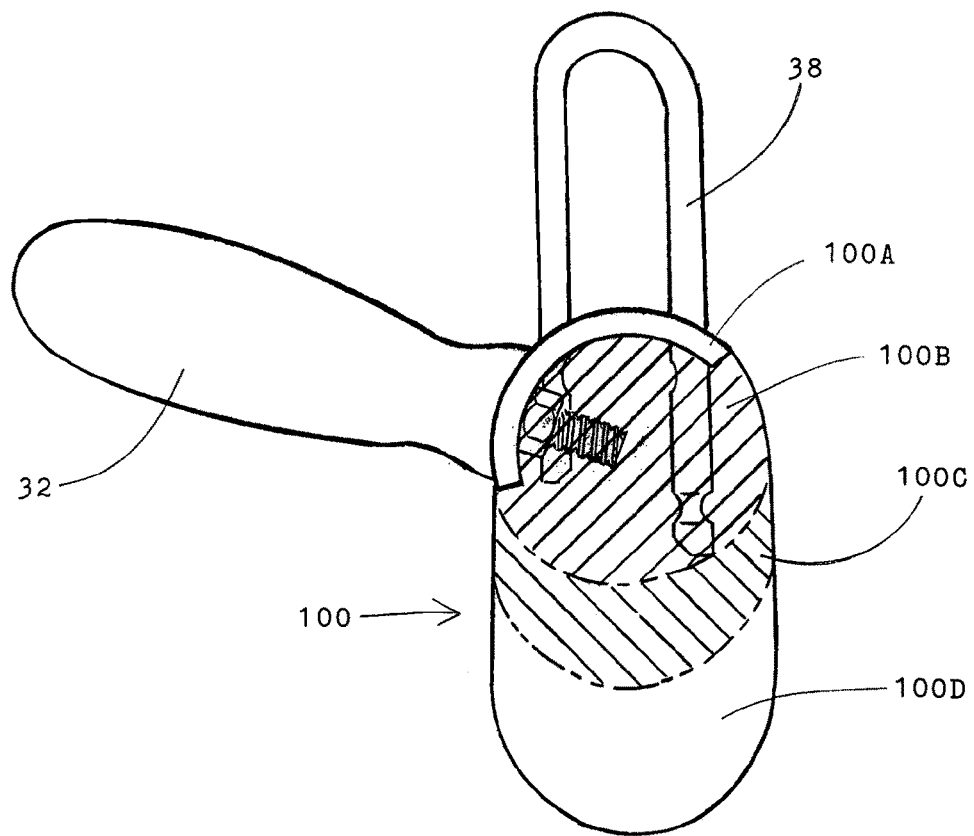
FIG. 25 is a partial sectional view of three sizes for the third embodiment.
Figure 2:
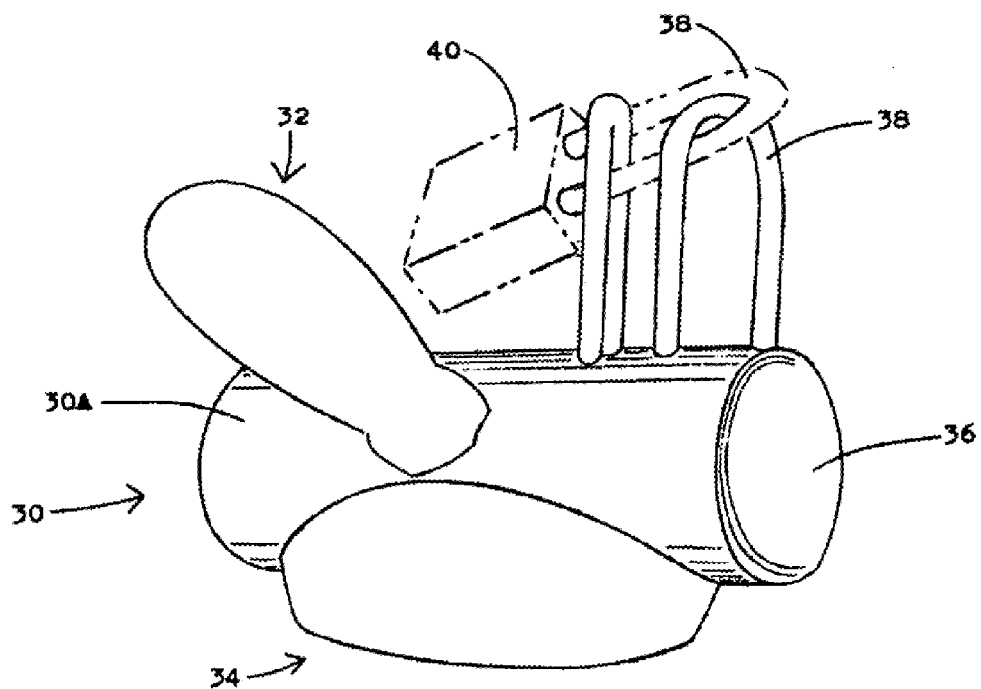
Figure 1:
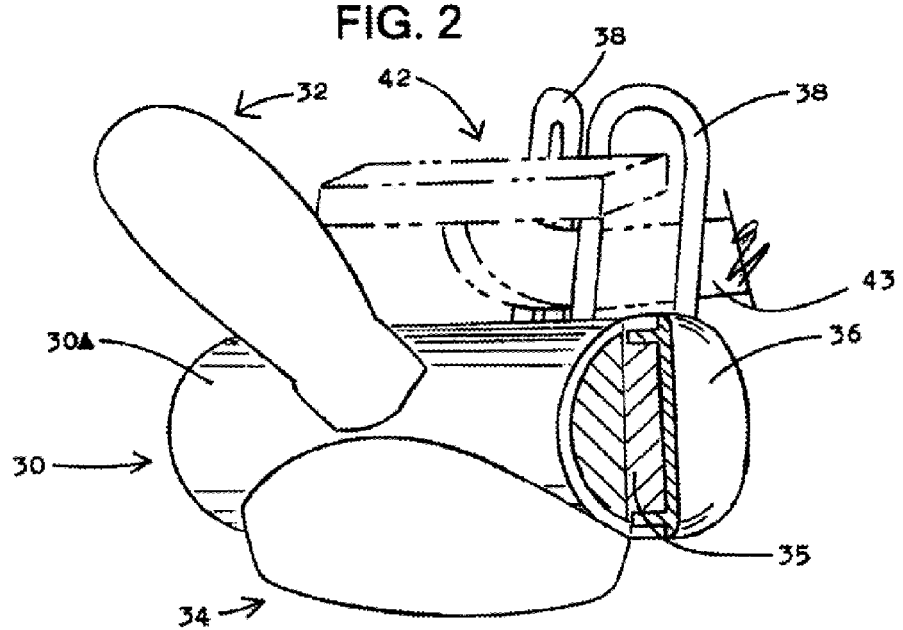
Figure 3:
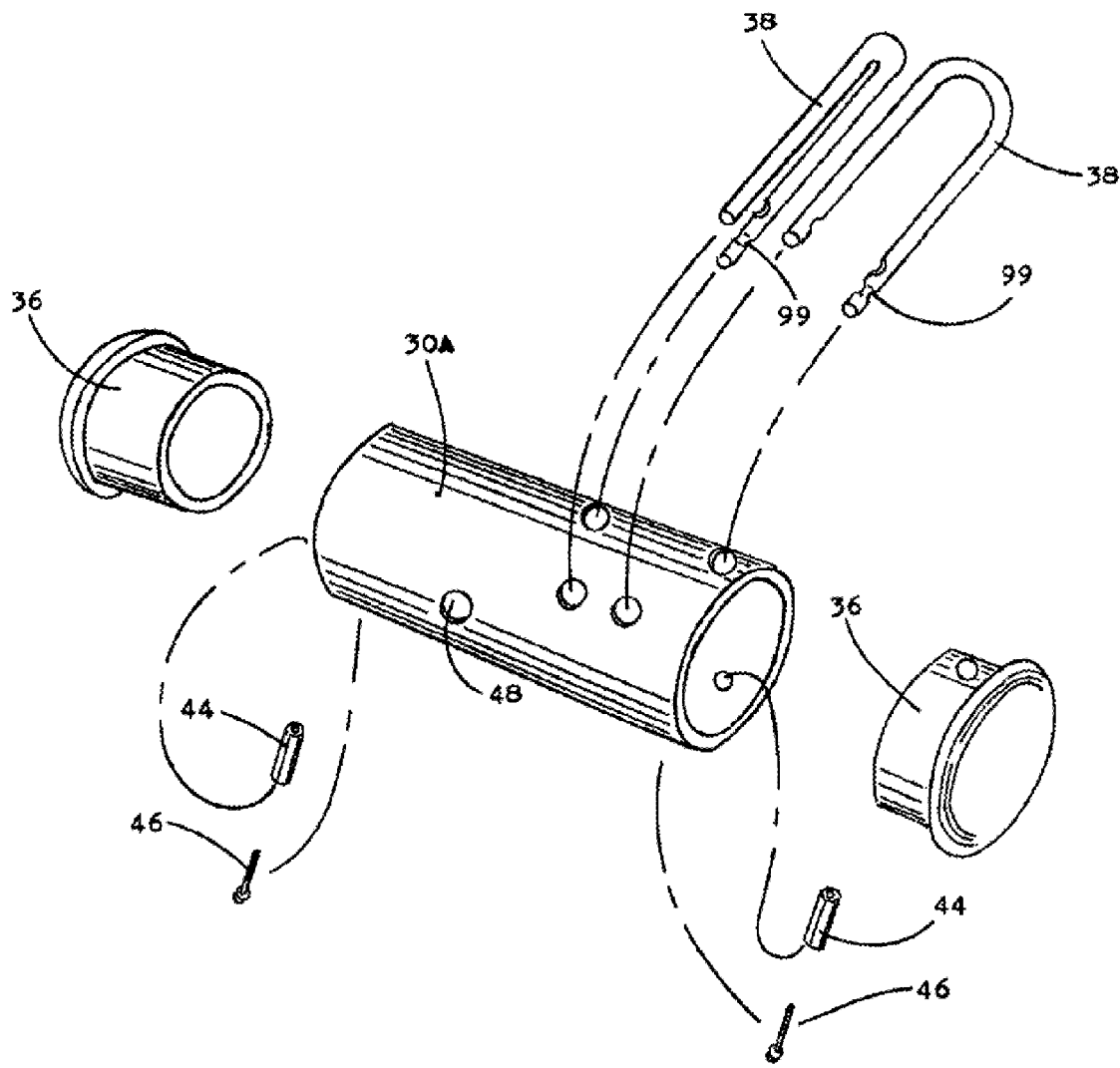
Figure 5:
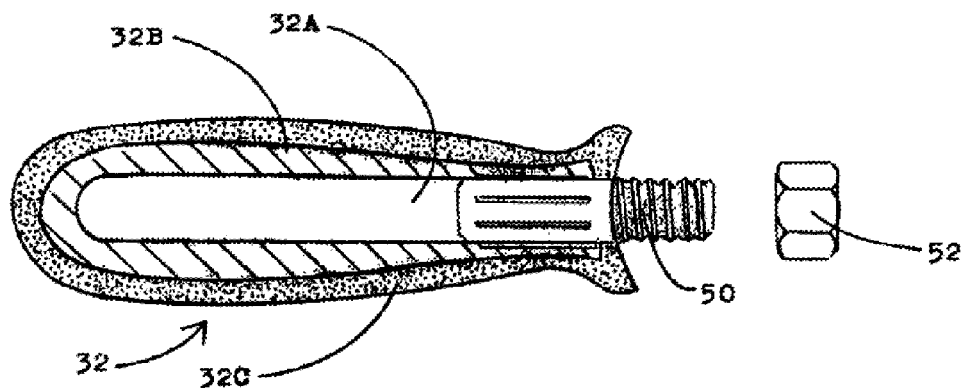
Figure 4:
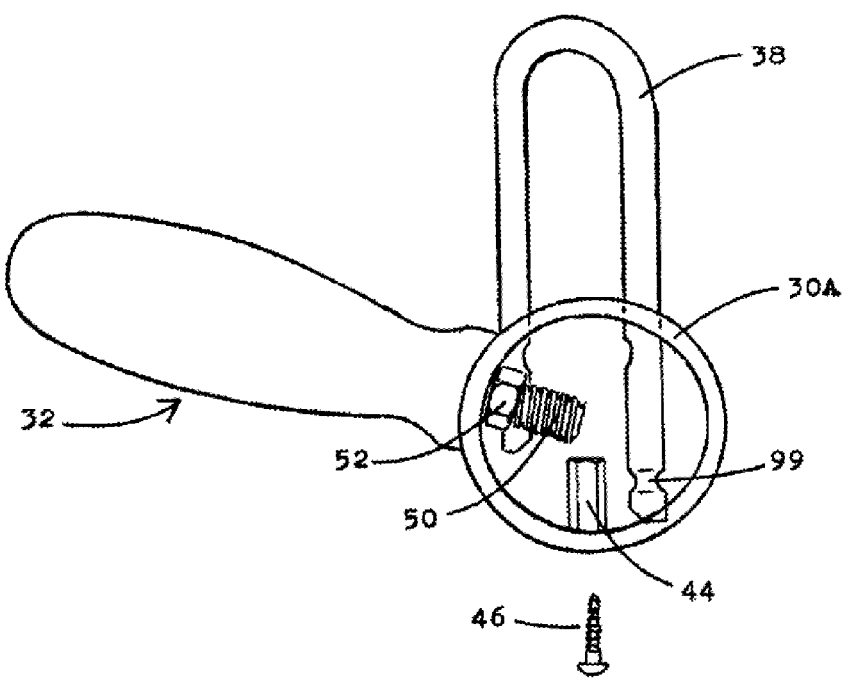
Figure 7:
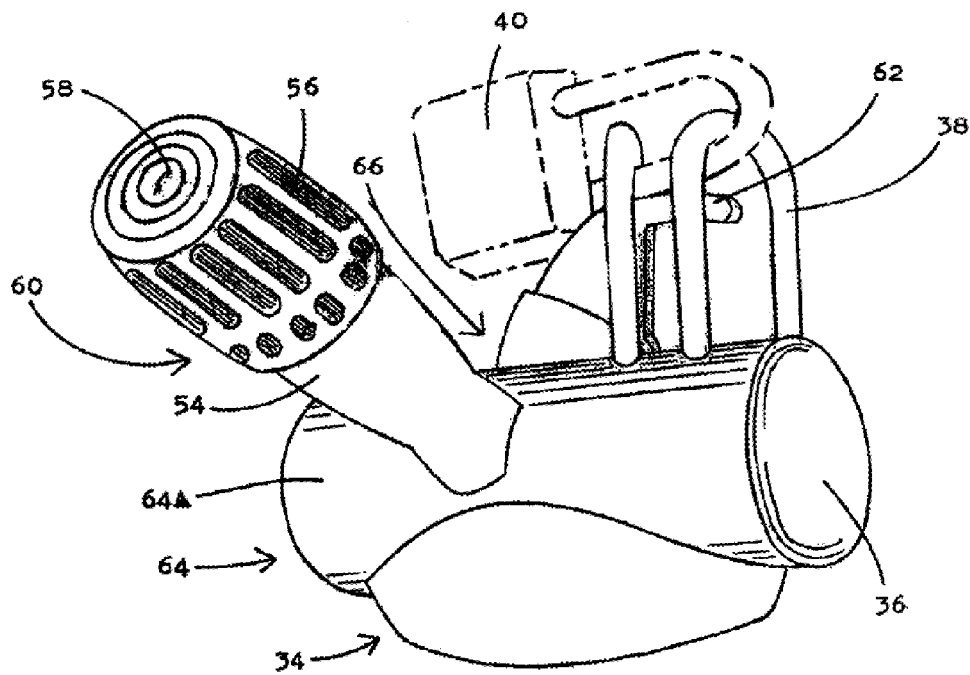
Figure 6:
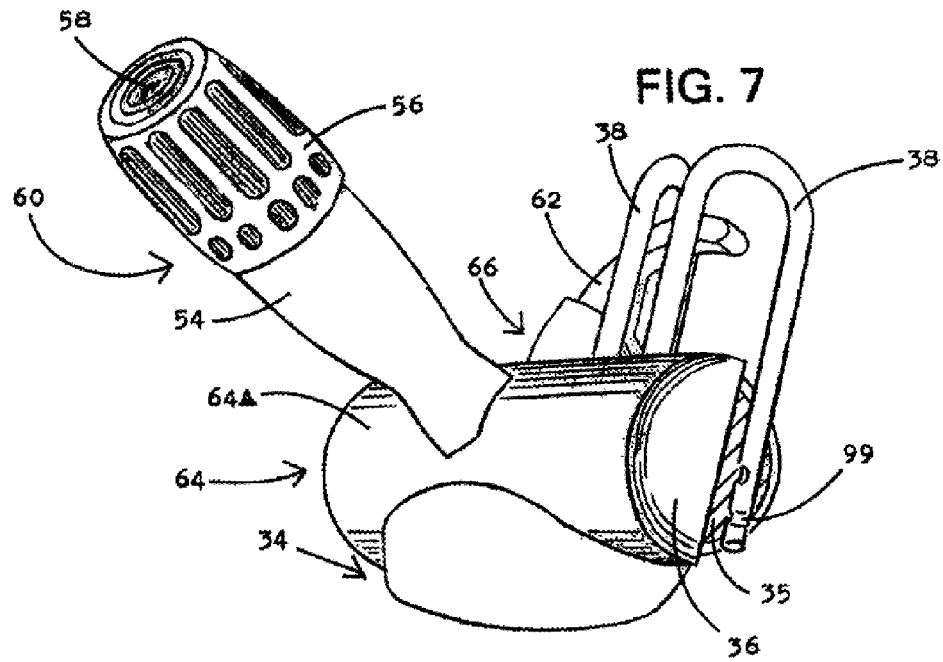
Figure 9:
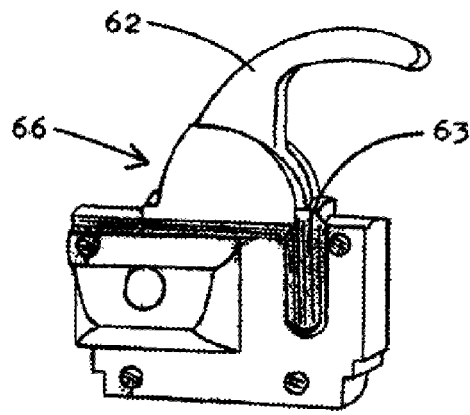
Figure 8:
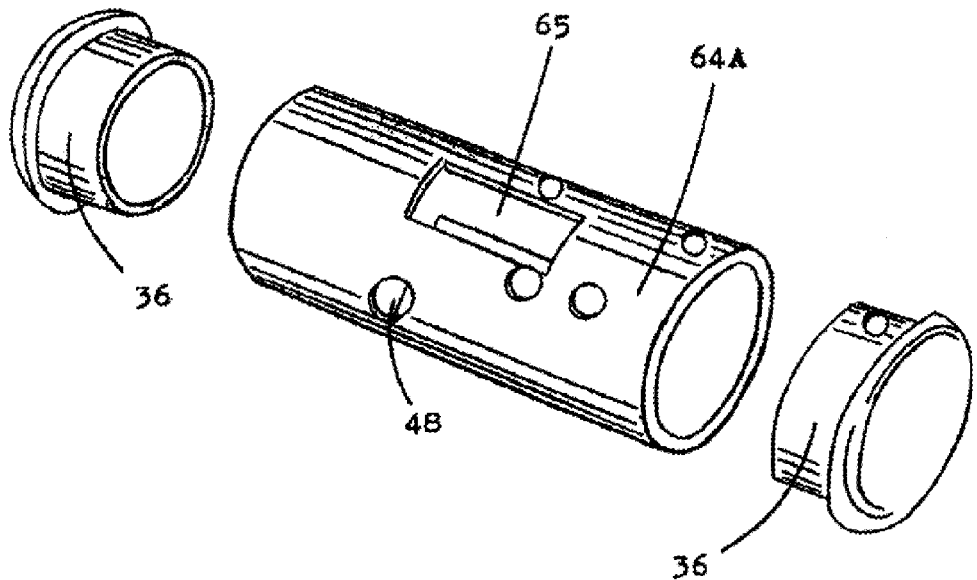
Figure 11:
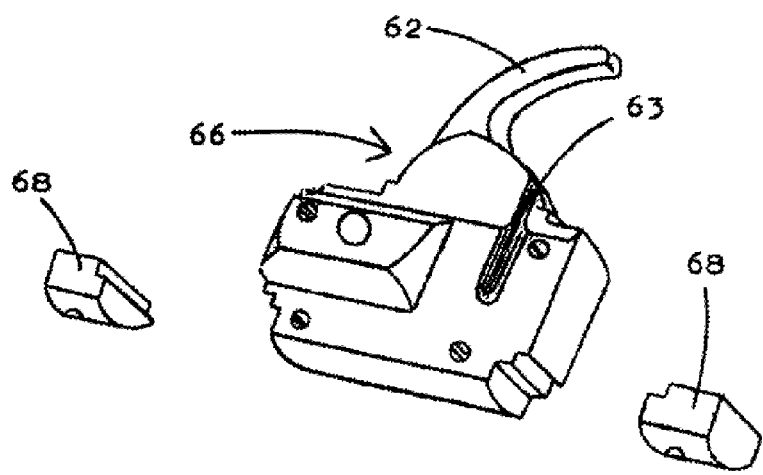
Figure 10:
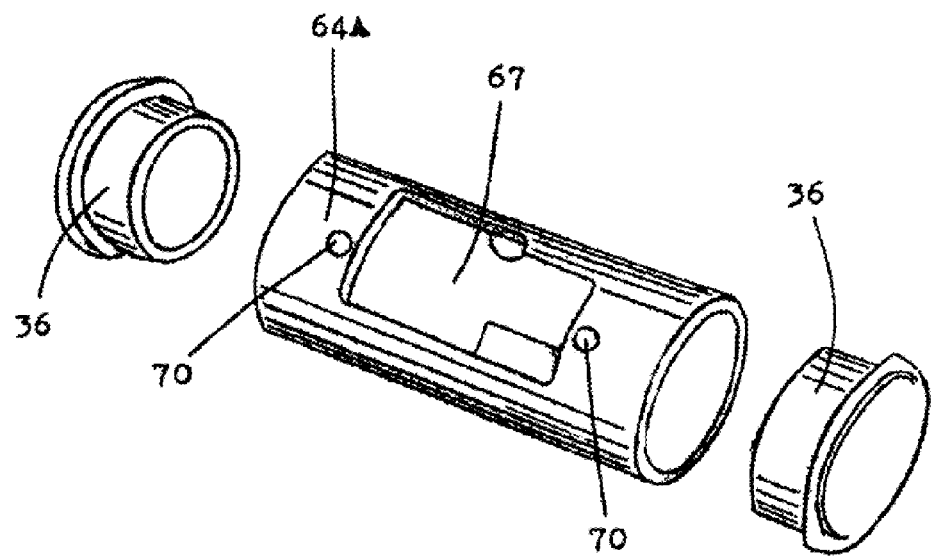
Figure 12:
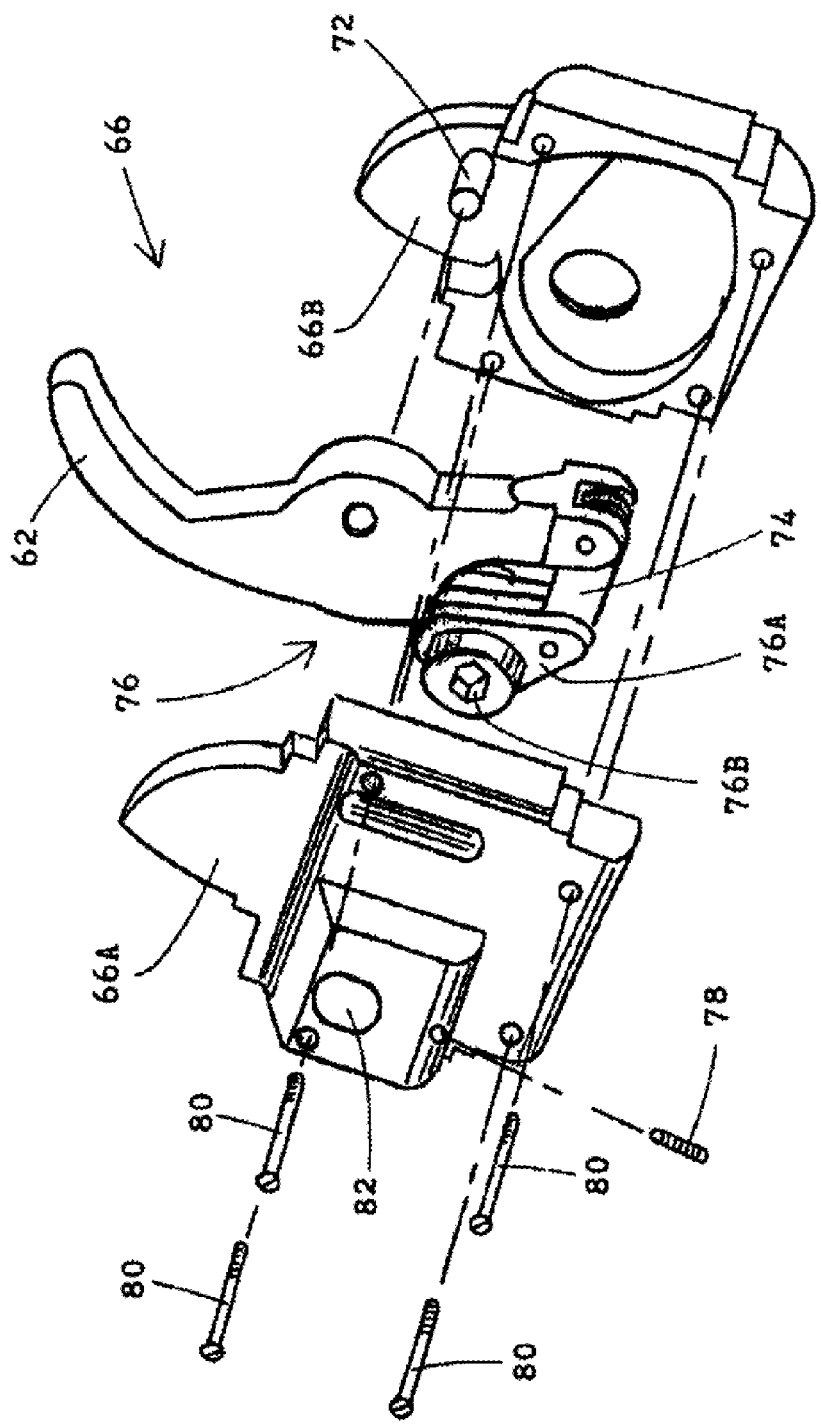
Figure 14:
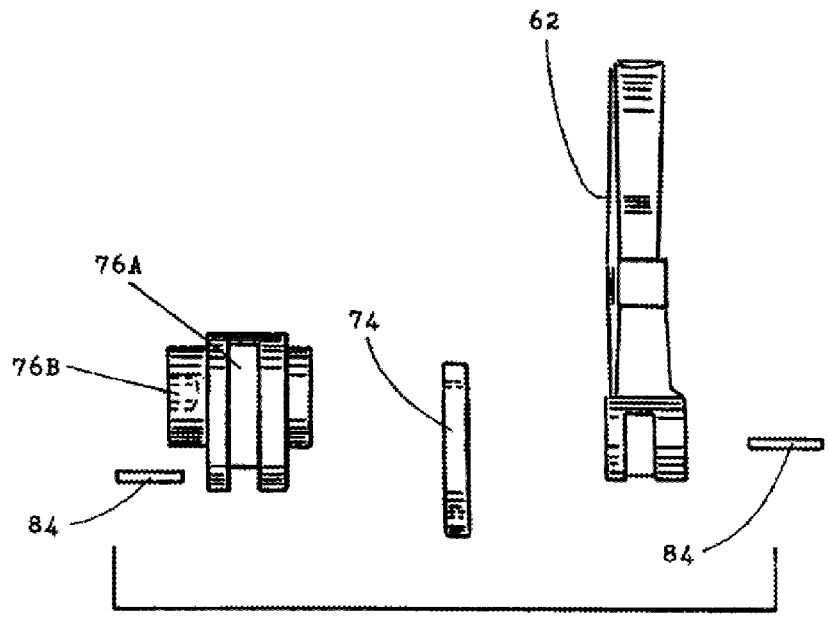
Figure 13:
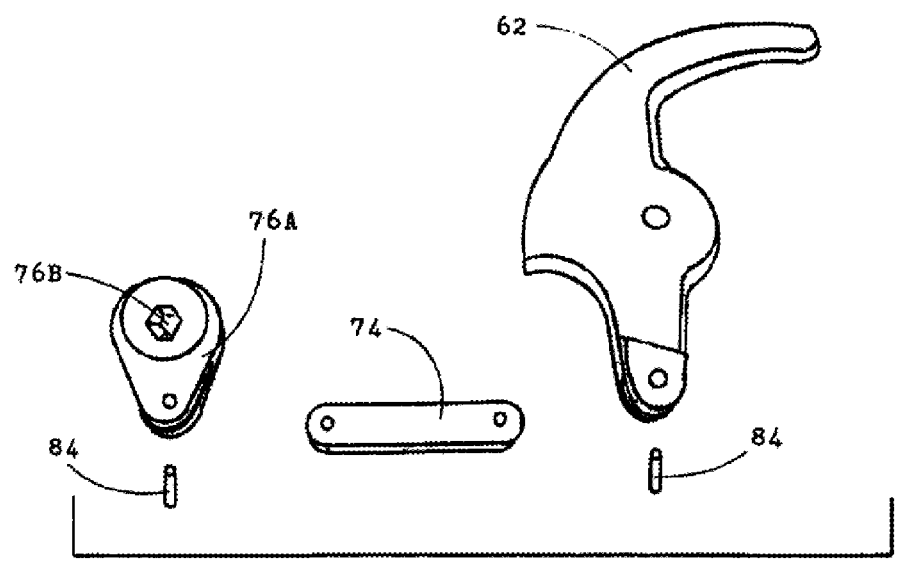
Figure 18:
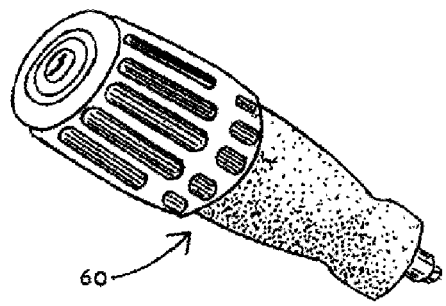
Figure 16B:
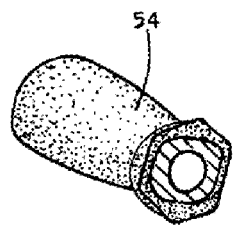
Figure 17:
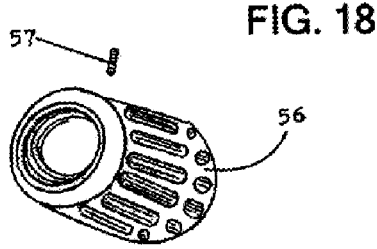
Figure 16A:
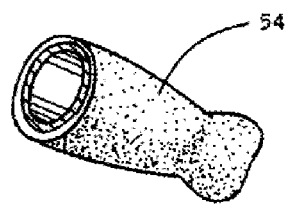
Figure 15:
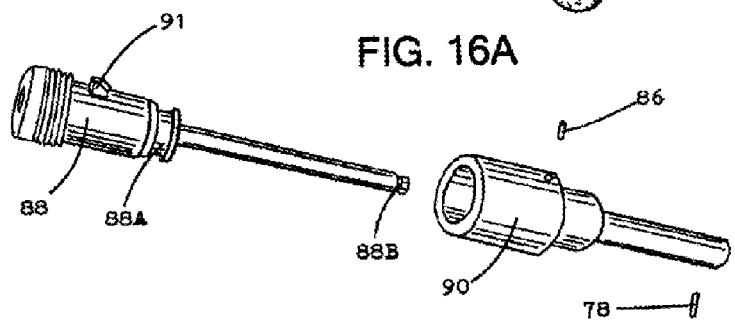
Figure 22:
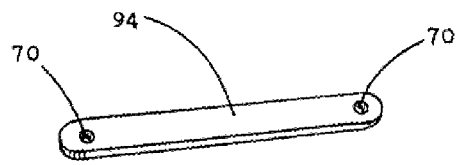
Figure 21C:
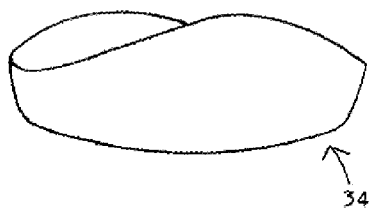
Figure 21B:
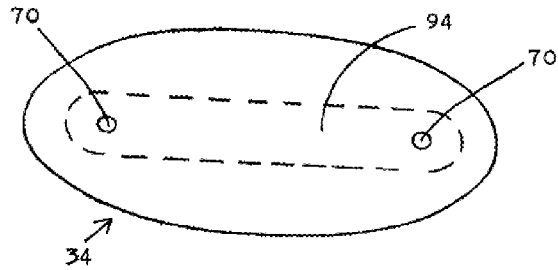
Figure 21A:
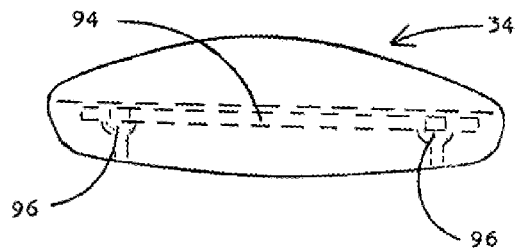
Figure 24:
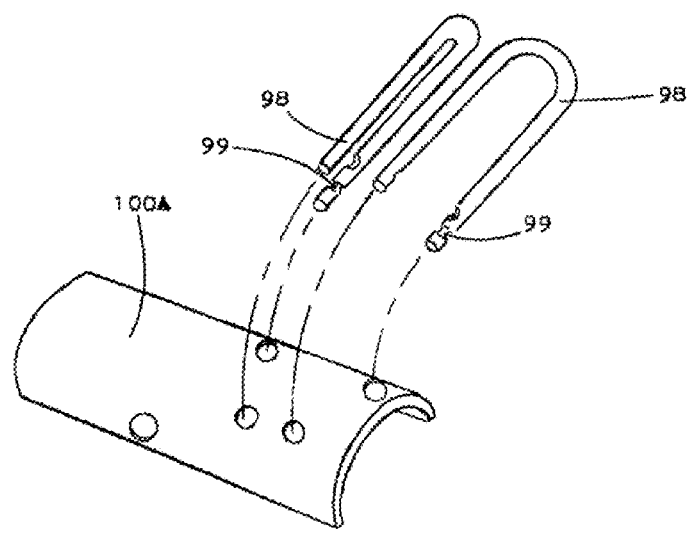
Figure 23:
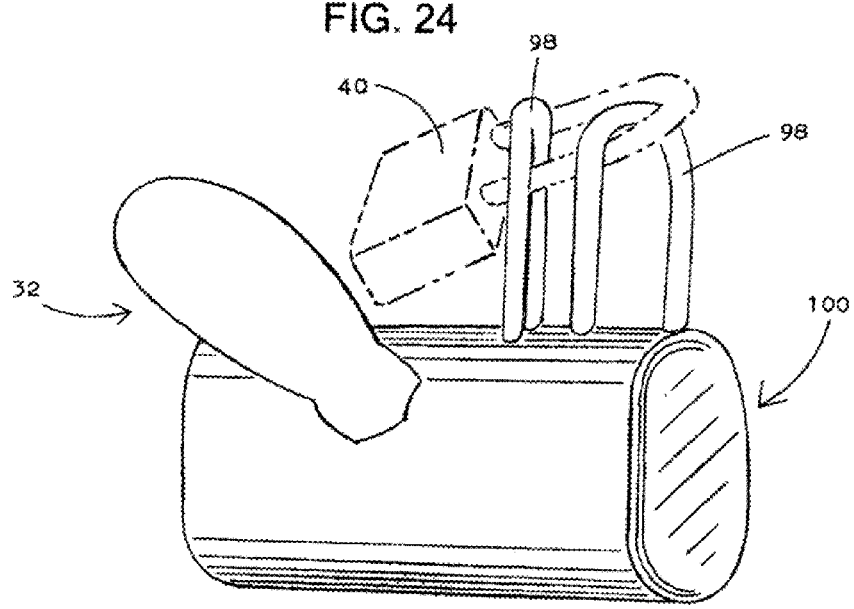
Figure 25:
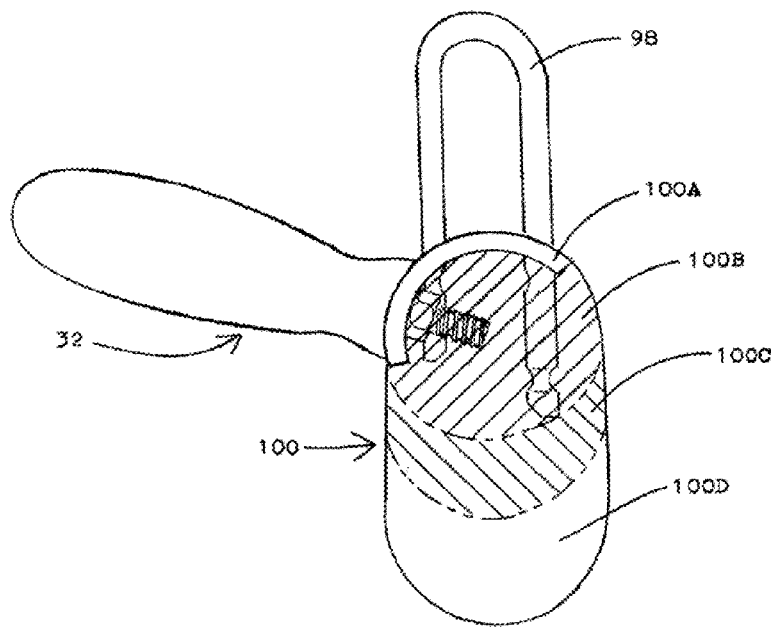

FIG. 25 shows a partial sectional view of this third embodiment of this anti-theft device comprising u-shaped rod shackles 98, handle 32, the adapter piece 100A, three sizes for the elongated barrier mass 100, as represented by 100B, 100C, and 100D.

It will be clear to those skilled in the art that modifications to the embodiments described above may be accomplished without compromising the integrity of the invention. It is understood, therefore, that this invention is not limited by the description disclosed. The singular character of control regarding the embodiments of this invention is governed by the claims to be specified herein.

I claim:

1. A portable, anti-theft brake pedal locking device, positional between the under edge of a brake pedal shaft, the under edge of a clutch pedal shaft when present, and a floorboard of a motor vehicle, comprising:
   a. a barrier member, composed of tubing, horizontally axially disposed relative to said floorboard and the pedal shafts, filled with an adhesive aggregated mix, said adhesive aggregate mix contained within by end-caps, and
   b. first and second, engaging padlock shackles, wherein said barrier member disposes said first and second, engaging padlock shackles above, perpendicular to the horizontal axis of said barrier member, held fixedly within said barrier member, extending therefrom said barrier member to positions at either side and above said brake pedal shaft, and
   c. said first and second, engaging padlock shackles defining provision for an independent locking means.

2. The portable, anti-theft brake pedal locking device of claim 1, further including a bottom spacer, to be horizontally disposed and in abutment to the undersurface of said barrier member, to be screw bolt attached to said barrier member, said bottom spacer to comprise a moldable construction, formed about an inner-rigid, reinforcement bar, containing two apertures for the placement of spacer-screws, said bottom spacer to be dimensionally proportioned for the height therebetween said floorboard and said pedal shafts.

3. The portable, anti-theft brake pedal locking device of claim 1, wherein said first and second, engaging padlock shackles are positioned above, extending therefrom said barrier member, axially perpendicular to the axis of said barrier member, relatively axially paralleled to each other, at spaced-angled positions, the forward rod extensions of said first and second, engaging padlock shackles being of greater space therebetween than the nearward rod extensions, said first and second, engaging padlock shackles dimensionally proportioned to provide apertures, for said independent locking means.

4. The portable, anti-theft brake pedal locking device of claim 1, further including a handle, comprised of a resilient surfacing, with a single point of attachment, extending from a nearward surface location of said barrier member, outwardly towards an installer, at a relative right angle to the axis of said barrier member, united to said barrier member by means of a threaded stud, fixedly part of said handle, and threaded to a nut element, joining said handle to said tubing of said barrier member.

5. A portable, anti-theft brake pedal locking device, positional between the under edge of a brake pedal shaft, the under edge of a clutch pedal shaft when present, and a floorboard of a motor vehicle, comprising:
   a. a horizontal barrier piece, horizontally axially disposed relative to said floorboard and the pedal shafts, said horizontal barrier piece includes a containment tube, working elements and an adhesive aggregate mix, the elements and the mix contained within by end-caps, and
   b. first and second, engaging padlock shackles, wherein said horizontal barrier piece disposes said first and second, engaging padlock shackles above, perpendicular to the axis of said horizontal barrier piece, held fixedly within said horizontal barrier piece, extending therefrom said horizontal barrier piece to positions at either side and above said brake pedal shaft, at spaced-angled positions, the forward rod extensions of said first and second, engaging padlock shackles being of greater space therebetween, than the space therebetween the nearward rod extensions, and
   c. a rotary, integral locking means, and
   d. provision for an independent, secondary locking means.

6. The portable, anti-theft brake pedal locking device of claim 5, further including a bottom spacer, to be horizontally disposed and in abutment to the underside of said horizontal barrier piece, to be screw bolt attached to the underside of said horizontal barrier piece, said bottom spacer comprising a moldable construction, formed about an inner-rigid, reinforcement bar, containing two apertures for the placement of spacer-screws, said bottom spacer to be dimensionally proportioned for the height therebetween said floorboard and said pedal shafts.

7. The portable, anti-theft brake pedal locking device of claim 5, wherein said rotary, integral locking means comprises a pivoting, catching lock member, housed within an enclosure assembly, within said horizontal barrier piece, acted upon by a pivoting operator and sliding-guide, and positioned to rotatably pivot into inter-connection with said first and second, engaging padlock shackles at a position above said brake pedal shaft, thereafter being in allowance with any employment of said independent, secondary locking means.

8. The portable, anti-theft brake pedal locking device of claim 7, further includes additional operating elements housed within a handle, said handle extending from a nearward surface location at a relative right angle to said horizontal barrier piece, towards an installer, said handle enclosing a lock-containing control rod within, activated through provision for a key lock, said key lock being housed as a unity with said lock-containing control rod and a grip member as part of said handle, with said lock-containing control rod, provides a means for urging said pivoting, catching lock member into inter-connection in a fixed lock-position with said first and second, engaging padlock shackles.

9. The portable, anti-theft brake pedal locking device according to claim 8, wherein said first and second, engaging padlock shackles are formed so as to provide for apertures of suitable size for acceptance of said pivoting, catching lock member, in addition being provisioning for said independent, secondary locking means, through use of an independent locking device.

10. The portable, anti-theft brake pedal locking device of claim 5, wherein said adhesive aggregate mix comprises an adhesive plastic and microsphere composition.

11. A portable, anti-theft brake pedal locking device, positional between the under edge of a brake pedal shaft, the under edge of a clutch pedal shaft when present, and a floorboard of a motor vehicle, comprising:

a. an elongated barrier mass, horizontally axially disposed, relative to said floorboard and the pedal assemblies, including an adapter piece, as part of a molded manufacture, said elongated barrier mass to be sized differentially as required to accommodate the distance between said floorboard and said pedal shafts, and b. first and second, u-shaped rod shackles, wherein said elongated barrier mass disposes said first and second, u-shaped rod shackles above, perpendicular to the axis of said elongated barrier mass, held fixedly within said elongated barrier mass, extending therefrom said elongated barrier mass to positions at either side and above said brake pedal shaft, at spaced-angled positions, the forward rod extensions of said first and second, u-shaped rod shackles being of greater space therebetween than the space therebetween the nearward rod extensions, and c. said u-shaped rod shackles defining provision for an independent locking means.

12. The portable, anti-theft brake pedal locking device of claim 11, further including a handle, comprising a resilient surfacing, with a single point of attachment, extending from a nearward surface location of said elongated barrier mass, outwardly towards an installer, and at relative right angle to the axis of said elongated barrier mass, united to said elongated barrier mass through connection with said adapter piece, by means of a threaded stud, fixedly part of said handle, and thereby threaded to a nut element.

13. The portable, anti-theft brake pedal locking device of claim 11, wherein said first and second, u-shaped rod shackles being cylindrically contoured, have indentation depressions proximate to their rod endings.

14. The portable, anti-theft brake pedal locking device of claim 11, wherein said first and second, u-shaped rod shackles are dimensionally proportioned to provide apertures for said independent locking means formed of an independent locking device.

* * * * *

UNITED STATES PATENT AND TRADEMARK OFFICE
CERTIFICATE OF CORRECTION

PATENT NO. : 7,434,428 B1  
APPLICATION NO. : 11/784167  
DATED : October 14, 2008  
INVENTOR(S) : John William Carroll It is certified that error appears in the above-identified patent and that said Letters Patent is hereby corrected as shown below:

The title page should be deleted and substitute therefor the attached title page.

Drawings:
Delete drawing sheets 1 - 9, and substitute therefor the drawing sheets consisting of Figs. 1-18 as shown on the attached pages.

Signed and Sealed this

Twentieth Day of January, 2009

JON W. DUDAS  
*Director of the United States Patent and Trademark Office*

United States Patent
Carroll

(10) Patent No.: US 7,434,428 B1
(45) Date of Patent: Oct. 14, 2008

(54) ANTI-THEFT PEDAL LOCKING DEVICE FOR MOTOR VEHICLES

(76) Inventor: John William Carroll, P.O. Box 742, Berkeley, CA (US) 94701

(*) Notice: Subject to any disclaimer, the term of this patent is extended or adjusted under 35 U.S.C. 154(b) by 0 days.

(21) Appl. No.: 11/784,167

(22) Filed: Apr. 5, 2007

(51) Int. Cl.
*F16H 57/00* (2006.01)

(52) U.S. Cl. .................. 70/200; 70/203; 70/237

(58) Field of Classification Search .......... 70/198–203, 70/237, 238, 254; 254/DIG. 5
See application file for complete search history.

(56) References Cited

U.S. PATENT DOCUMENTS

| | | | |
|---|---|---|---|
| 1,165,352 A * | 12/1915 | Whiteside | 70/202 |
| 1,211,064 A * | 1/1917 | Boyce | 70/202 |
| 1,247,512 A * | 11/1917 | Dobler | 70/202 |
| 1,317,547 A * | 9/1919 | Cameron | 70/199 |
| 1,318,443 A | 10/1919 | Gimperling | |
| 1,329,644 A * | 2/1920 | Van Deventer et al. | 70/200 |
| 1,388,149 A | 8/1921 | Friedrich | |
| 1,442,203 A * | 1/1923 | Williams et al. | 70/202 |
| 1,444,935 A * | 2/1923 | Mokracek | 70/200 |
| 1,494,717 A * | 5/1924 | Sell | 70/203 |
| 1,527,992 A * | 3/1925 | Norton | 70/200 |
| 4,076,095 A | 2/1978 | Adamski | |
| 4,333,326 A | 6/1982 | Winters | |
| 4,493,198 A | 1/1985 | Brown | |
| 4,700,555 A | 10/1987 | Robertson, Sr. et al. | |
| 4,993,248 A | 2/1991 | Nordberg | |
| 5,022,697 A * | 6/1991 | Hettwer | 296/37.6 |
| 5,267,458 A | 12/1993 | Heh | |
| 5,282,373 A | 2/1994 | Riccitelli | |
| 5,537,846 A | 7/1996 | Simon | |
| 5,613,382 A | 3/1997 | Uter | |
| 5,639,001 A * | 6/1997 | Brady | 224/449 |
| 5,715,710 A | 2/1998 | De Lucia et al. | |
| 5,845,521 A | 12/1998 | Najera | |
| 5,906,121 A | 5/1999 | Mankarious | |
| 5,921,116 A | 7/1999 | Goldenberg | |
| 5,979,197 A | 11/1999 | Mellini et al. | |
| 6,006,559 A | 12/1999 | Hsu | |
| 6,202,456 B1 | 3/2001 | Vickers | |
| 6,662,894 B2 * | 12/2003 | Chantrasuwan et al. | 180/287 |
| 6,758,071 B1 * | 7/2004 | Reeb et al. | 70/201 |
| 6,792,780 B1 | 9/2004 | De Lucia | |
| 2005/0103065 A1 * | 5/2005 | Dennis | 70/56 |

* cited by examiner

*Primary Examiner*—Lloyd A Gall

(57) ABSTRACT

A portable anti-theft brake pedal locking device for a motor vehicle, comprising a horizontal barrier member, upwardly extending, u-shaped rod shackle engaging members, and a manner of locking the device against removal from beneath existing brake/clutch pedal(s). The manner of locking may be either by a lock integral to the anti-theft device, in the form of a pivoting catching lock member, or by a lock independent of the anti-theft device, such as by a padlock. This portable anti-theft device in its preferred embodiment may be double-locked through use of the lock integral to the anti-theft device, and also secondarily by use of the independent locking padlock. Through the placement of this device beneath the under edge of a brake pedal shaft, the under edge of a clutch pedal shaft when present, against the vehicle floorboard, and locking the device to the brake pedal shaft, a resulting disabling of the operation of such pedals is accomplished by preventing the pedals being depressed. This anti-theft device is a significant improvement over prior art in being universal as to application, simple in its operation, compact and thus easily stored.

14 Claims, 13 Drawing Sheets

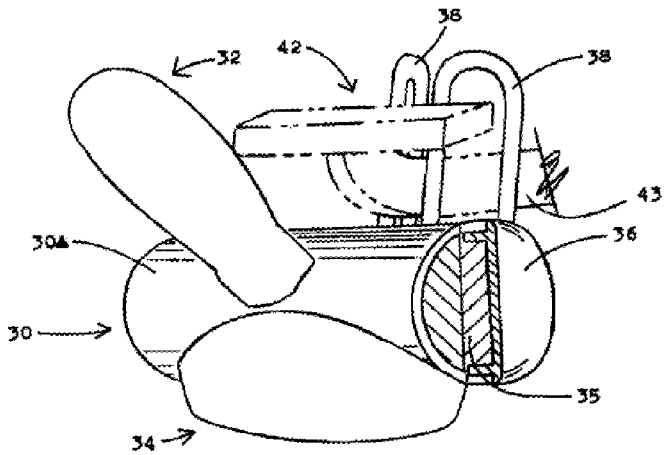

UNITED STATES PATENT AND TRADEMARK OFFICE
CERTIFICATE OF CORRECTION

PATENT NO.        : 7,434,428 B1
APPLICATION NO.   : 11/784167
DATED             : October 14, 2008
INVENTOR(S)       : John William Carroll It is certified that error appears in the above-identified patent and that said Letters Patent is hereby corrected as shown below:

Drawings:

Delete drawing sheets 1-3, and substitute therefor the drawing sheets, consisting of Figs. 22-25, as shown on the attached pages.

Signed and Sealed this

Seventeenth Day of February, 2009

JOHN DOLL
*Acting Director of the United States Patent and Trademark Office*